US010889730B2

(12) United States Patent
Morinaga et al.

(10) Patent No.: US 10,889,730 B2
(45) Date of Patent: *Jan. 12, 2021

(54) OIL-BASED INKJET INK SET AND METHOD FOR PRODUCING PRINTED ITEM

(71) Applicant: RISO KAGAKU CORPORATION, Tokyo (JP)

(72) Inventors: Marie Morinaga, Ibaraki (JP); Toshihiro Endo, Ibaraki (JP); Shinichiro Shimura, Ibaraki (JP); Kazuyuki Ando, Ibaraki (JP); Hikaru Sugiura, Ibaraki (JP); Shinsuke Ozawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 16/141,054

(22) Filed: Sep. 25, 2018

(65) Prior Publication Data
US 2019/0100671 A1 Apr. 4, 2019

(30) Foreign Application Priority Data
Sep. 29, 2017 (JP) .................. 2017-189870

(51) Int. Cl.
*C09D 11/40* (2014.01)
*C09D 11/36* (2014.01)
(Continued)

(52) U.S. Cl.
CPC ........... *C09D 11/54* (2013.01); *B41M 5/0023* (2013.01); *C09D 11/033* (2013.01);
(Continued)

(58) Field of Classification Search
None
See application file for complete search history.

(56) References Cited

U.S. PATENT DOCUMENTS 4,338,133 A 7/1982 Toyoda
5,968,244 A 10/1999 Ueda et al.
(Continued)

FOREIGN PATENT DOCUMENTS

AU 2012247077 11/2012
CN 1576322 A 2/2005
(Continued)

OTHER PUBLICATIONS

English translation of JPH 04/248879, Sep. 1992; 13 pages.*
(Continued)

*Primary Examiner* — Helene Klemanski
(74) *Attorney, Agent, or Firm* — Greenblum & Bernstein, P.L.C.

(57) ABSTRACT

An oil-based inkjet ink set is disclosed that includes: an oil-based inkjet ink A containing a non-aqueous solvent, the non-aqueous solvent of the oil-based inkjet ink A containing at least 15% by mass of a silicone oil relative to the total mass of the non-aqueous solvent of the oil-based inkjet ink A, and an oil-based inkjet ink B containing a non-aqueous solvent, the non-aqueous solvent of the oil-based inkjet ink B containing at least 50% by mass of a petroleum-based hydrocarbon solvent relative to the total mass of the non-aqueous solvent of the oil-based inkjet ink B. A method for producing a printed item is also disclosed.

20 Claims, 4 Drawing Sheets

(51) Int. Cl.

| | | |
|---|---|---|
| *C09D 11/324* | (2014.01) | |
| *B41M 5/00* | (2006.01) | |
| *C09D 11/06* | (2006.01) | |
| *C09D 11/037* | (2014.01) | |
| *C09D 11/033* | (2014.01) | |
| *C09D 11/322* | (2014.01) | |
| *B41J 2/21* | (2006.01) | |
| *C09D 11/54* | (2014.01) | |

(52) U.S. Cl.
CPC ............ *C09D 11/037* (2013.01); *C09D 11/06* (2013.01); *C09D 11/322* (2013.01); *C09D 11/324* (2013.01); *C09D 11/36* (2013.01)

(56) References Cited

U.S. PATENT DOCUMENTS

| | | | | |
|---|---|---|---|---|
| 5,980,624 | A | 11/1999 | Ichikawa et al. | |
| 6,113,679 | A | 9/2000 | Adkins | |
| 7,834,072 | B2 | 11/2010 | Carlini et al. | |
| 8,038,784 | B2 * | 10/2011 | Watanabe | C09D 11/326 106/31.74 |
| 8,440,010 | B2 * | 5/2013 | Endo | C09D 11/54 106/31.26 |
| 8,507,585 | B2 | 8/2013 | Hosoya et al. | |
| 9,624,394 | B2 * | 4/2017 | Endo | C09D 11/10 |
| 9,624,402 | B2 * | 4/2017 | Shimura | B41J 2/1631 |
| 9,821,568 | B2 * | 11/2017 | Shimura | B41J 2/2107 |
| 9,845,402 | B2 * | 12/2017 | Shimura | B41J 2/01 |
| 2003/0220418 | A1 | 11/2003 | Horie | |
| 2004/0063811 | A1 | 4/2004 | Horie et al. | |
| 2004/0068031 | A1 | 4/2004 | Horie | |
| 2004/0265756 | A1 | 12/2004 | Horie | |
| 2005/0046675 | A1 | 3/2005 | Aoshima | |
| 2005/0119363 | A1 | 6/2005 | Yamada et al. | |
| 2006/0189712 | A1 | 8/2006 | Kondo | |
| 2007/0022904 | A1 | 2/2007 | Kitawaki et al. | |
| 2008/0194754 | A1 | 8/2008 | Nakamura | |
| 2009/0090271 | A1 | 4/2009 | Wynants et al. | |
| 2009/0263632 | A1 | 10/2009 | Kojima et al. | |
| 2010/0105807 | A1 | 4/2010 | Sugita et al. | |
| 2010/0136234 | A1 | 6/2010 | Kobayashi | |
| 2011/0232528 | A1 | 9/2011 | Endo et al. | |
| 2012/0006225 | A1 | 1/2012 | Tsukiana et al. | |
| 2012/0048141 | A1 | 3/2012 | Arai et al. | |
| 2018/0244936 | A1 | 8/2018 | Shimura et al. | |
| 2018/0244937 | A1 | 8/2018 | Sugiura et al. | |
| 2018/0244938 | A1 | 8/2018 | Morinaga et al. | |
| 2018/0244939 | A1 * | 8/2018 | Sugiura | C09D 11/102 |
| 2018/0244940 | A1 * | 8/2018 | Ando | C09D 11/102 |
| 2018/0244941 | A1 | 8/2018 | Sugiura et al. | |
| 2018/0327617 | A1 | 11/2018 | Inoue et al. | |
| 2019/0100002 | A1 | 4/2019 | Ozawa | |
| 2019/0100668 | A1 * | 4/2019 | Ando | C09D 11/40 |
| 2019/0134989 | A1 | 5/2019 | Matsumoto et al. | |
| 2019/0300737 | A1 | 10/2019 | Ozawa | |
| 2020/0040206 | A1 | 2/2020 | Sugiura | |

FOREIGN PATENT DOCUMENTS

| | | |
|---|---|---|
| CN | 101027370 A | 8/2007 |
| CN | 101652437 A | 2/2010 |
| CN | 102199382 A | 9/2011 |
| CN | 104610811 A | 5/2015 |
| CN | 106084984 A | 11/2016 |
| EP | 1493783 | 1/2015 |
| EP | 3093316 | 11/2016 |
| EP | 3 366 737 | 8/2018 |
| EP | 3 366 739 | 8/2018 |
| EP | 3366733 | 8/2018 |
| EP | 3461868 | 4/2019 |
| JP | 01203482 A | 8/1989 |
| JP | H03-292370 | 12/1991 |
| JP | H04-161467 | 6/1992 |
| JP | 04-248879 A | 9/1992 |
| JP | 2001-098196 | 4/2001 |
| JP | 2001-342388 | 12/2001 |
| JP | 2004-217703 A | 8/2004 |
| JP | 2005-60567 | 3/2005 |
| JP | 2006-307107 | 11/2006 |
| JP | 2006-315363 | 11/2006 |
| JP | 2007-154149 | 6/2007 |
| JP | 2010001452 | 1/2010 |
| JP | 2010/064478 | 3/2010 |
| JP | 2014-19766 | 2/2014 |
| JP | 2016-196564 | 11/2016 |

OTHER PUBLICATIONS

English translation of JP 2004/217703, Aug. 2004; 9 pages.*
Extended European Search Report from European Patent Office (EPO) in European Patent Appl. No. 18192237.8, dated Mar. 14, 2019.
"Silicone Fluid KF-96" from Shin-Etsu Chemical Co., Ltd.; shinetsusilicone-global.com/catalog/pdf/kf96_e.pdf. 2004; 36 pages.
Mar. 11, 2020 Office Action in copending U.S. Appl. No. 15/904,478, filed Feb. 26, 2018.
Apr. 9, 2020 Office Action in copending U.S. Appl. No. 15/904,481, filed Feb. 26, 2018.
Apr. 13, 2020 Office Action in copending U.S. Appl. No. 15/904,504, filed Feb. 26, 2018.
Apr. 7, 2020 Office Action in copending U.S. Appl. No. 15/904,476, filed Feb. 26, 2018.
Jan. 11, 2019 Office Action in copending U.S. Appl. No. 15/904,496, filed Feb. 26, 2018.
Office Action in U.S. Appl. No. 15/904,496 dated Sep. 21, 2018.
Apr. 15, 2020 Office Action in copending U.S. Appl. No. 16/141,003, filed Sep. 25, 2018.
English translation of JP 2010/064478, Mar. 2010; 40 pages.
"Development of a Three-Dimensional Bioprinter: Construction of a Cell Supporting Structures Using Hydrogel and State-Of-The-Art Inkjet Technology" by Nishiyama et al.; J. Biomechanical Engineering, 131(3): 035001, Mar. 2009; 6 pages.
Catalogue of Organic Modified Silicone, Dow Corning Toray Co., Ltd., in Japanese, with English Translation of p. 10 (2016).
"Silicon Compounds: Silanes and Silicones," *Gelest, A Survey of Properties and Chemistry*, 3$^{rd}$ Edition, edited by Barry Arkles & Gerald L. Larson, Gelest, Inc. Morrisville, PA, 608 pages (2013).
English translation of JP 01/203482, Aug. 1989; 6 pages.
English translation of JP 2016/196564, Nov. 2016; 29 pages.
English translation of JPH 03/292370, Dec. 1991; 6 pages.
English translation of JP 2001/098196, Apr. 2001; 12 pages.
English translation of JP 2006/307107, Nov. 2006; 28 pages.
"Reactive and Nonreactive Silicone Fluid" from Shin-Etsu Chemical Co., Ltd., shinetsusilicone-global.cona/catalog/pdf/modified e.pdf, 2006; 10 pages.
"Phenyl Methyl Silicon Fluid" www.organosilicon.com/en/68083-14-7.htm, no date available; 1 page.
Apr. 13, 2020 Office Action in copending U.S. Appl. No. 15/904,508, filed Feb. 26, 2018.
European Search Report issued with respect to Application No. 18158568.8, dated May 24, 2018.
European Search Report issued with respect to Application No. 18158557.1, dated May 24, 2018.
European Search Report issued with respect to Application No. 18158565.4, dated Jun. 1, 2018.
European Search Report issued with respect to Application No. 18158577.9, dated Jun. 21, 2018.
European Search Report issued with respect to Application No. 18158573.8, dated Jul. 18, 2018.
European Search Report issued with respect to Application No. 18158552.2, dated May 17, 2018.
Official Communication issued in European Patent Office (EPO) Patent Application No. 18 158 557.1 dated Sep. 5, 2019.
Official Action dated Aug. 5, 2020 in the counterpart Chinese application No. 201810159232.X with translation.

(56) References Cited

OTHER PUBLICATIONS

Latest Practical Manual of Printing Technology, Letterpress Printing Technology Bulletin, Guangzhou, Tibet, p. 119, Hefei: Anhui Audio-Visual Publishing House, Nov. 2003. See #1, the English translation of SIPO's Office Action at pp. 4-5 as a concise explanation of pertinence of this non-patent literature.
"Silicone Production and Application Technology", Institute of Scientific and Technological Information, Ministry of Chemical Industry, p. 86 Institute of Scientific and Technological Information, Ministry of Chemical Industry, Dec. 1985. See #1, the English translation of SIPO's Office Action at pp. 4-5 as a concise explanation of pertinence of this non-patent literature.
"Modern Fine Chemical Technology and Product Synthesis Processes", Kwong Shenglu, pp. 273-274, Beijing: Science and Technology Literature Publishing House, Dec. 1997. See #1, the English translation of SIPO's Office Action at pp. 4-5 as a concise explanation of pertinence of this non-patent literature.
Official Action dated October 9, 2020 in the counterpart Chinese application No. 2018101590767 (U.S. Appl. No. 15/904,476).
Official Action dated October 14, 2020 in the counterpart Chinese application No. 2018101594274 (corresponding to U.S. Appl. No. 15/904,478) and its partial machine translation.
Copy of Official Action dated October 14, 2020 in the counterpart Chinese application No. 2018101613824 (corresponding to U.S. Appl. No. 15/904,481) and its partial machine translation.
"Industrial Plastics Dictionary", 1st edition, Su Jiaxai et al., p. 19, Chemical Industry Publishing Co., Ltd., release date: Dec. 31, 1989. See #2, the English translation of SIPO's Office Action as a concise explanation of pertinence of this non-patent literature.
*Functional Polmer Materials* (2nd Edition), Royal Construction, pages 331~334, Doje University Press, release date: Jun. 30, 2014, See #2, and 3, the English translation of SIPO's Office Action as a concise explanation of pertinence of this non-patent literature.
*Practical Manual For Cosmetics Raw Material Standards*, 1st edition, China Flavored Cosmetics Industry Association, pp. 71-73, China Standard Publishing, release date March 31, 2002. See #2, the English translation of SIPO's Office Action as a concise explanation of pertinence of this non-patent literature.
*Overview Of The Chemical Industry*, 1st edition, Peng Shishimatsu et al., pp. 280-282, Chemical Industry Publishing Company, release date: Jun. 30, 1989. See #3, the English translation of SIPO's Office Action as a concise explanation of pertinence of this non-patent literature.
*Printing Material And Suitability*, 2nd Edition, Jiang Xuecheng et al., pp. 140-143, Tohoku Forestry University Press. Release Date: Aug. 31, 2016. See #3, the English translation of SIPO's Office Action as a concise explanation of pertinence of this non-patent literature.
*Kako Encyclopedia* (The Eighth Volume), 1st edition, Chemical Encyclopedia Editorial Department, pp. 957-958, Chemical Industry Publishing Company, release date Sep. 30, 1994. See #3, the English translation of SIPO's Office Action as a concise explanation of pertinence of this non-patent literature.

* cited by examiner

OIL-BASED INKJET INK SET AND METHOD FOR PRODUCING PRINTED ITEM

CROSS REFERENCE TO RELATED APPLICATIONS

This application is based upon and claims the benefit of priority from the prior Japanese Patent Application No. 2017-189870, filed on Sep. 29, 2017, the entire contents of which are incorporated by reference herein.

BACKGROUND OF THE INVENTION

Field of the Invention

Embodiments of the present invention relate to an oil-based inkjet ink set and a method for producing a printed item.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

When a printed item having an image formed using an oil-based inkjet ink is stored by insertion in a clear file formed from polypropylene (PP) or the like, a problem arises in that the clear file tends to deform. One reason for this deformation is that when the clear file contacts the printed surface, the ink components cause one surface of the clear file to swell.

JP 2004-217703 A proposes that by using an inkjet non-aqueous pigment ink containing a silicone-based solvent, a pigment, and a specific modified silicone oil as a dispersant, ink stability, nozzle blockages and clear file deformation can be improved.

JP H04-248879 A proposes that by using an inkjet recording ink containing, at least, 2 to 95 wt % of a silicone-based solvent with a boiling point of 100° C. to 250° C. and a colorant that is insoluble in the solvent, good print quality can be obtained regardless of the paper quality, satisfactory durability can be achieved several seconds after printing, and vivid images can be obtained with no color mixing in color images.

SUMMARY OF THE INVENTION

An embodiment of the present invention provides an oil-based inkjet ink set that includes: an oil-based inkjet ink A, which is a black ink and contains a pigment, a pigment dispersant and a non-aqueous solvent, the non-aqueous solvent of the oil-based inkjet ink A containing at least 15% by mass of a silicone oil relative to the total mass of the non-aqueous solvent of the oil-based inkjet ink A, and an oil-based inkjet ink B, which is a color ink and contains a pigment, a pigment dispersant and a non-aqueous solvent, the non-aqueous solvent of the oil-based inkjet ink B containing at least 50% by mass of a petroleum-based hydrocarbon solvent relative to the total mass of the non-aqueous solvent of the oil-based inkjet ink B.

Another embodiment of the present invention provides an oil-based inkjet ink set that includes: an oil-based inkjet ink A containing a non-aqueous solvent, the non-aqueous solvent of the oil-based inkjet ink A containing at least 15% by mass of a silicone oil relative to the total mass of the non-aqueous solvent of the oil-based inkjet ink A, and an oil-based inkjet ink B containing a non-aqueous solvent, the non-aqueous solvent of the oil-based inkjet ink B containing at least 50% by mass of a petroleum-based hydrocarbon solvent relative to the total mass of the non-aqueous solvent of the oil-based inkjet ink B, wherein the oil-based inkjet ink set is used for inkjet printing which includes, using an inkjet head having a first nozzle portion and a second nozzle portion, discharging the oil-based inkjet ink A from the first nozzle portion and discharging the oil-based inkjet ink B from the second nozzle portion to form an image on a recording medium.

Another embodiment of the present invention provides a method for producing a printed item, including discharging two or more inks onto a recording medium to form an image, wherein the two or more inks include an oil-based inkjet ink A, which is a black ink and contains a pigment, a pigment dispersant and a non-aqueous solvent, the non-aqueous solvent of the oil-based inkjet ink A containing at least 15% by mass of a silicone oil relative to the total mass of the non-aqueous solvent of the oil-based inkjet ink A, and an oil-based inkjet ink B, which is a color ink and contains a pigment, a pigment dispersant and a non-aqueous solvent, the non-aqueous solvent of the oil-based inkjet ink B containing at least 50% by mass of a petroleum-based hydrocarbon solvent relative to the total mass of the non-aqueous solvent of the oil-based inkjet ink B.

Another embodiment of the present invention provides a method for producing a printed item, including, using an inkjet head having a first nozzle portion and a second nozzle portion, discharging an oil-based inkjet ink A from the first nozzle portion and discharging an oil-based inkjet ink B from the second nozzle portion to form an image on a recording medium, wherein the oil-based inkjet ink A contains a non-aqueous solvent, and the non-aqueous solvent of the oil-based inkjet ink A contains at least 15% by mass of a silicone oil relative to the total mass of the non-aqueous solvent of the oil-based inkjet ink A, and the oil-based inkjet ink B contains a non-aqueous solvent, and the non-aqueous solvent of the oil-based inkjet ink B contains at least 50% by mass of a petroleum-based hydrocarbon solvent relative to the total mass of the non-aqueous solvent of the oil-based inkjet ink B.

DETAILED DESCRIPTION OF THE EMBODIMENTS

Figure 1:
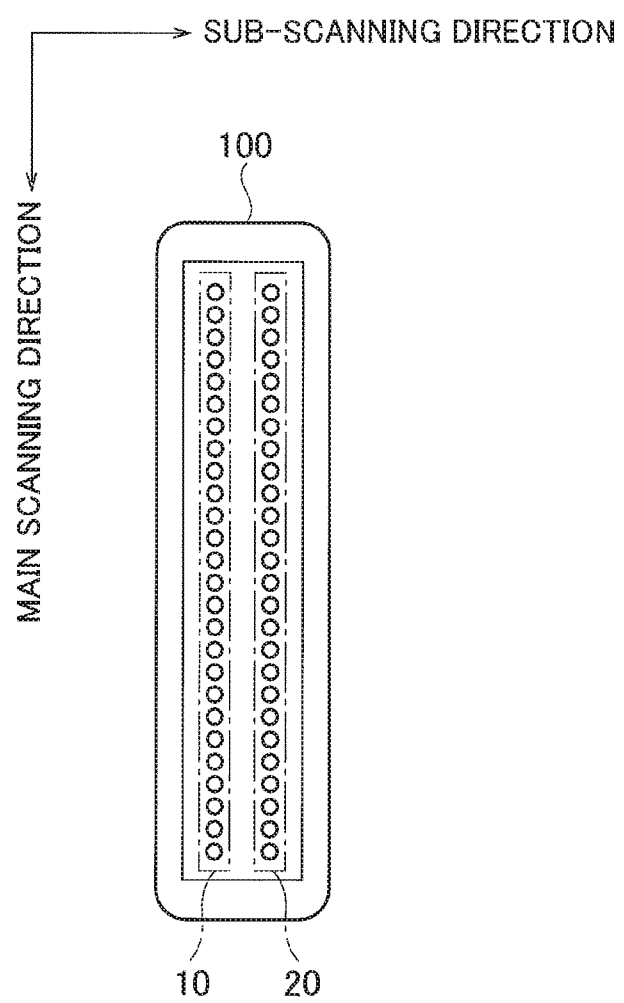
FIG. 1 is a schematic drawing illustrating one example of an inkjet head.

Embodiments of the present invention are described below, but the following embodiments in no way limit the present invention.

In the following description, an oil-based inkjet ink is sometimes referred to as simply an "ink". Further, an oil-based inkjet ink set is sometimes referred to as simply an "ink set". The oil-based inkjet ink A and the oil-based inkjet ink B are sometimes referred to as "the ink A" and "the ink B" respectively.

An object of an embodiment of the present invention is to provide an oil-based inkjet ink set that enables printed items to be produced at low cost and is capable of preventing the deformation of clear files caused by printed items.

An object of another embodiment of the present invention is to provide a method for producing a printed item that enables the printed item to be produced at low cost and is capable of preventing the deformation of clear files caused by the printed item.

Oil-Based Inkjet Ink Set

Oil-Based Inkjet Ink Set of First Embodiment

The oil-based inkjet ink set of an embodiment of the present invention includes an oil-based inkjet ink A, which is a black ink and contains a pigment, a pigment dispersant and a non-aqueous solvent, the non-aqueous solvent of the oil-based inkjet ink A containing at least 15% by mass of a silicone oil relative to the total mass of the non-aqueous solvent of the oil-based inkjet ink A, and an oil-based inkjet ink B, which is a color ink and contains a pigment, a pigment dispersant and a non-aqueous solvent, the non-aqueous solvent of the oil-based inkjet ink B containing at least 50% by mass of a petroleum-based hydrocarbon solvent relative to the total mass of the non-aqueous solvent of the oil-based inkjet ink B. In the following description, this oil-based inkjet ink set is sometimes referred to as the oil-based inkjet ink set of a first embodiment or the ink set of a first embodiment.

Because the oil-based inkjet ink B contains an inexpensive petroleum-based hydrocarbon solvent in an amount of at least 50% by mass relative to the total mass of the non-aqueous solvent, this oil-based inkjet ink set may be produced at low cost, meaning printed items may be produced at low cost.

When a printed item prepared using an oil-based ink is inserted in a clear file, and particularly a clear file composed of polypropylene (PP), and when the ink components of the printed item, and particularly the non-aqueous solvent components, volatilize and make contact with the clear file, the inside surface of the clear file may sometimes degenerate considerably, and may undergo either swelling or shrinking relative to the outside surface of the clear file, resulting in deformation of the clear file.

Among the various non-aqueous solvents used in oil-based inks, this type of deformation tends to occur more readily when the structure of a petroleum-based hydrocarbon solvent is similar to that of the polypropylene of the clear file. In a similar manner to petroleum-based hydrocarbon solvents, deformation of clear files can also occur for those fatty acid ester-based solvents, higher fatty acid-based solvents, and higher alcohol-based solvents and the like when the structure thereof is similar structures to polypropylene.

According to this oil-based inkjet ink set, in which the oil-based inkjet ink A contains a silicone oil in an amount of at least 15% by mass relative to the total mass of the non-aqueous solvent, clear file deformation by printed items may be prevented.

Further, with this ink set, favorable black image density may be obtained immediately after printing. Although not constrained by any particular theory, the reasons for this are thought to include the following. Because silicone oils tend to have a low viscosity, a high boiling point and low surface tension, and also tend to readily separate from pigments and pigment dispersants, inks containing a silicone oil tend to have a large dot diameter, and also tend to produce better retention of the pigment on the recording medium. As a result, when the oil-based inkjet ink A containing a silicone oil is used as a black ink, the black image density immediately after printing may be improved.

When a black color is formed by mixing a black ink and a color ink, the color appears more dense due to subtractive color mixing. Accordingly, in typical systems, black colors are printed by combining a plurality of color inks with a black ink. Among the black ink and the color inks used in this type of color mixing to form a black color, the black ink is used in the largest amount. As a result, by adding a silicone oil to the black ink, the image density immediately after printing of a black image formed by mixing the black ink and one or more color inks may be improved.

Accordingly, using the oil-based inkjet ink set of the first embodiment, printed items may be produced at low cost, clear file deformation caused by printed items may be prevented, and the black image density immediately after printing may be improved.

Further, using this ink set, deterioration in the image density of black images over time may also be suppressed. Although not constrained by any particular theory, the reasons for this are thought to include the following. After printing, as ink components either penetrate into the recording medium such as the paper or volatilize over time, the smoothness of the printed surface on the recording medium deteriorates due to the fine unevenness on the surface of the recording medium, and diffuse reflections can sometimes cause an apparent deterioration in the image density. On the other hand, silicone oils tend to have low volatility, and following penetration into the recording medium, tend to be easily retained within the interior of the recording medium, and as a result, it is thought that when an ink containing a silicone oil is used, diffuse reflections caused by unevenness on the surface of the recording medium tend to be more easily suppressed.

The ink A is described below.

The ink A is a black ink and contains a pigment, a pigment dispersant and a non-aqueous solvent.

The ink A may contain a pigment as a colorant.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

In the ink A, the pigment preferably contains a carbon black. The ink A may contain, for example, a carbon black as the main pigment, but also contain one or more other pigments such as an azo pigment, phthalocyanine pigment, polycyclic pigment, dye lake pigment or metal oxide.

The dispersed form of the pigment may be, for example, a dispersion in which a so-called encapsulated pigment in which the pigment is coated with an oil-insoluble resin, or colored resin particles, are dispersed using a pigment dispersant, but a dispersion in which a pigment dispersant is adsorbed directly to the pigment surface is preferable.

From the viewpoints of discharge stability and storage stability, the average particle diameter of the pigment is preferably not more than 300 nm, more preferably not more than 200 nm, and even more preferably 150 nm or less.

The amount of the pigment is typically from 0.01 to 20% by mass of the total mass of the ink, and from the viewpoints of print density and ink viscosity, is preferably from 1 to 15% by mass, and more preferably from 5 to 10% by mass.

In order to ensure stable dispersion of the pigment in the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names), manufactured by ISP Japan Ltd.;

Solsperse 13940 (a polyester amine-based dispersant), 16000, 17000 and 18000 (fatty acid amine-based dispersants), and 11200, 24000 and 28000 (all product names), manufactured by The Lubrizol Corporation;

Efka 400, 401, 402, 403, 450, 451 and 453 (modified polyacrylates) and Efka 46, 47, 48, 49, 4010 and 4055 (modified polyurethanes) (all product names), manufactured by BASF Japan Ltd.;

Disparlon KS-860 and KS-873N4 (polyester amine salts) (both product names), manufactured by Kusumoto Chemicals, Ltd.;

Discol 202, 206, OA-202 and OA-600 (multi-chain polymeric nonionic dispersants) (all product names), manufactured by DKS Co., Ltd.;

DISPERBYK 2155 and 9077 (both product names). manufactured by BYK-Chemie Japan K.K.; and Hypermer KD2, KD3, KD11 and KD12 (all product names), manufactured by Croda Japan K.K.

The amount of the pigment dispersant need only be sufficient to enable satisfactory dispersion of the pigment within the ink, and may be set as appropriate. For example, the pigment dispersant is typically added in a mass ratio within a range from 0.1 to 5, and preferably from 0.1 to 1, relative to a value of 1 for the pigment. The pigment dispersant is typically added in an amount of 0.01 to 10% by mass, and preferably from 0.01 to 5% by mass, relative to the total mass of the ink.

In an oil-based ink, the amount of resin components, including the pigment dispersant, relative to the total mass of the ink, is typically not more than 10% by mass, preferably not more than 7% by mass, and even more preferably 5% by mass or less. This may prevent any increase in the ink viscosity, and may further improve the discharge performance.

The ink A preferably contains a silicone oil.

The silicone oil is a compound that has a silicon atom and a carbon atom in one molecule, and is liquid at 23° C.

Compounds having a silyl group, compounds having a silyloxy group, and compounds having a siloxane linkage and the like can be used as the silicone oil, and polysiloxane compounds can be used particularly favorably.

Chain-like silicone oils, cyclic silicone oils, and modified silicone oils and the like can be used as the silicone oil.

The chain-like silicone oil is preferably a chain-like polysiloxane having 2 to 30 silicon atoms, more preferably 2 to 20 silicon atoms, and even more preferably 3 to 10 silicon atoms. Examples of the chain-like silicone oils include linear dimethyl silicone oils such as tetradecamethylhexasiloxane and hexadecamethylheptasiloxane, and branched dimethyl silicone oils such as methyltris(trimethylsiloxy)silane and tetrakis(trimethylsiloxy)silane.

The cyclic silicone oil is preferably a cyclic polysiloxane having 5 to 9 silicon atoms, and cyclic dimethyl silicone oils such as decamethylcyclopentasiloxane, dodecamethylcyclohexasiloxane, hexadecamethylcyclooctasiloxane and octadecamethylcyclononasiloxane can be used favorably.

Examples of the modified silicone oils include silicone oils having any of various organic groups introduced at a portion of the silicon atoms of a chain-like or cyclic dimethyl silicone oil. Modified silicone oils in which all of the silicon atoms are bonded solely to carbon atoms or the oxygen atoms of siloxane linkages are preferred. The modified silicone oil is preferably a non-reactive silicone oil. Modified silicone oils in which the constituent atoms do include atoms other than silicon atoms, carbon atoms, oxygen atoms and hydrogen atoms are preferred.

Examples of compounds that may be used as the modified silicone oil include compounds in which at least one methyl group contained in a chain-like or cyclic dimethyl silicone oil has been substituted with at least one group selected from the group consisting of alkyl groups, carboxylate ester linkage-containing groups, aromatic ring-containing groups and ether linkage-containing groups.

Further, other examples of compounds that may be used as the modified silicone oil include compounds in which at least one silicon atom contained in a chain-like or cyclic dimethyl silicone oil is bonded to a silicon atom of another chain-like or cyclic dimethyl silicone oil via an alkylene group. In these cases, at least one methyl group contained in the chain-like or cyclic dimethyl silicone oils that are linked via the alkylene group may be substituted with at least one group selected from the group consisting of alkyl groups, carboxylate ester linkage-containing groups, aromatic ring-containing groups and ether linkage-containing groups.

Specific examples of the modified silicone oil include alkyl-modified silicone oils, aryl-modified silicone oils such as phenyl-modified silicone oils and aralkyl-modified silicone oils, carboxylate ester-modified silicone oils, alkylene-modified silicone oils, and polyether-modified silicone oils.

In the modified silicone oil, the number of silicon atoms is preferably from 2 to 20, more preferably from 2 to 10, even more preferably from 2 to 6, and most preferably from 3 to 6.

Examples of the alkyl-modified silicone oils include silicone oils having one, or two or more, alkyl groups of 2 to 20 carbon atoms such as an ethyl group, propyl group, n-butyl group, isobutyl group, tert-butyl group, pentyl group, hexyl group, heptyl group, octyl group, isooctyl group, nonyl group, decyl group, dodecyl group, hexadecyl group or eicosyl group in one molecule.

Examples of the aryl-modified silicone oils include silicone oils having one, or two or more, functional groups such as a phenyl group, tolyl group, xylyl group, trimethylphenyl group, biphenylyl group, naphthyl group, anthracenyl group, or a group in which at least one hydrogen atom of one of these groups has been substituted with an alkyl group, in one molecule.

Among these, examples of phenyl-modified silicone oils include methyl phenyl silicones such as diphenyl dimethicone, trimethylsiloxyphenyl dimethicone, phenyl trimethicone, diphenylsiloxyphenyl trimethicone, trimethylpentaphenyltrisiloxane, and 1,1,1,5,5,5-hexamethyl-3-phenyl-3-(trimethylsilyloxy)trisiloxane.

Examples of the carboxylate ester-modified silicone oils include silicone oils having one, or two or more, alkylcarbonyloxy groups having an alkyl group of 1 to 20 carbon atoms or alkoxycarbonyl groups having an alkoxy group of 1 to 20 carbon atoms in one molecule.

Commercially available products may be used as the silicone oil, and examples of products that may be used include "KF-96L-2CS", "KF-96L-5CS" and "KF-56A" manufactured by Shin-Etsu Chemical Co., Ltd., "DC246 Fluid" and "FZ-3196" manufactured by Dow Corning Toray Co., Ltd., and "1,1,1,5,5,5-hexamethyl-3-phenyl-3-(trimethylsilyloxy)trisiloxane", "decamethylcyclopentasiloxane" and "dodecamethylcyclohexasiloxane" manufactured by Tokyo Chemical Industry Co., Ltd.

Examples of the modified silicone oil include silicone oils having 2 to 6 silicon atoms in one molecule, having an organic group in which a carbon atom is bonded directly to a silicon atom and in which the total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule. In the following description, this type of silicone oil is also referred to as the modified silicone oil S.

The modified silicone oil S may contain one or more groups selected from the group consisting of groups (A) to (D) described below as the organic group in which the total number of carbon atoms and oxygen atoms is at least 4.

(A) Alkyl groups having at least 4 carbon atoms.
(B) Carboxylate ester linkage-containing groups in which the total number of carbon atoms and oxygen atoms is at least 4.
(C) Aromatic ring-containing groups having at least 6 carbon atoms.
(D) Alkylene groups having at least 4 carbon atoms.

For example, one or more compounds selected from the group consisting of compounds (A) to (D) described below can be used as the modified silicone oil S.

(A) Compounds having a main-chain siloxane linkage and an alkyl group having at least 4 carbon atoms, hereafter also referred to as alkyl-modified silicone oils S.

(B) Compounds having a main-chain siloxane linkage and a carboxylate ester linkage-containing group in which the total number of carbon atoms and oxygen atoms is at least 4, hereafter also referred to as ester-modified silicone oils S.

(C) Compounds having a main-chain siloxane linkage and an aromatic ring-containing group having at least 6 carbon atoms, hereafter also referred to as aryl-modified silicone oils S.

(D) Compounds having a siloxane linkage bonded to the carbon atom at one terminal of an alkylene group having at least 4 carbon atoms, and having a silyl group or a siloxane linkage bonded to the carbon atom at the other terminal of the alkylene group, hereafter also referred to as alkylene-modified silicone oils S.

In the modified silicone oil S, the total number of carbon atoms and oxygen atoms contained in all of the organic groups in which the total number of carbon atoms and oxygen atoms is at least 4 is preferably 4 or greater, more preferably 8 or greater, and even more preferably 10 or greater, in one molecule. This enables ink wetting of the nozzle plate surface to be reduced.

In the modified silicone oil S, the total number of carbon atoms and oxygen atoms contained in all of the organic groups in which the total number of carbon atoms and oxygen atoms is at least 4 is preferably not more than 20, more preferably not more than 16, and even more preferably 12 or fewer, in one molecule. This enables the ink to have a lower viscosity, and can improve the discharge performance.

In those cases where one molecule of the modified silicone oil S contains two or more of the organic groups in which the total number of carbon atoms and oxygen atoms is at least 4, the total number of carbon atoms and oxygen atoms, in one molecule, that are contained within all of the organic groups in which the total number of carbon atoms and oxygen atoms is at least 4 refers to the total number of carbon atoms and oxygen atoms contained in the two or more organic groups which each have a total number of carbon atoms and oxygen atoms of at least 4.

From the viewpoint of preventing adhesion of the ink to the nozzle plate, the modified silicone oil S is preferably a compound in which the total number of carbon atoms and oxygen atoms, contained within all of the organic groups in which the total number of carbon atoms and oxygen atoms is at least 4, is from 4 to 12 within one molecule.

From the viewpoints of lowering the viscosity of the ink and improving the discharge performance, the modified silicone oil S is preferably a compound in which the total number of carbon atoms and oxygen atoms, contained within all of the organic groups in which the total number of carbon atoms and oxygen atoms is at least 4, is from 8 to 20 within one molecule.

Examples of the modified silicone oil S include silicone oils represented by general formula (X) shown below.

General formula (X)

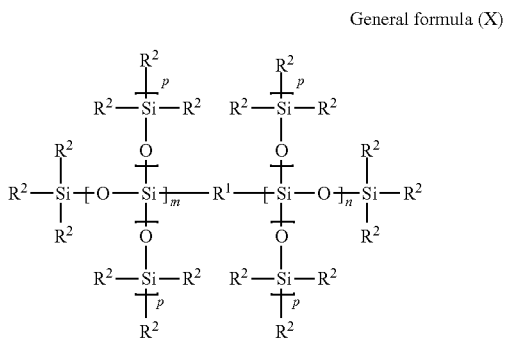

General formula (X-1)

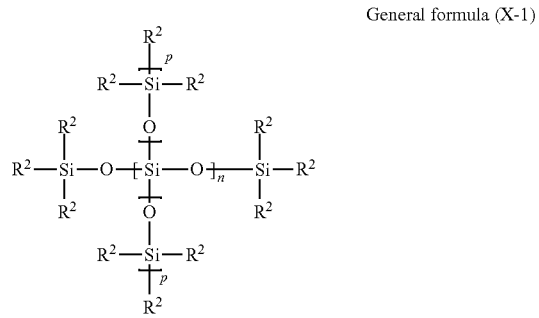

In general formula (X), $R^1$ represents an oxygen atom or a divalent organic group having a carbon atom bonded directly to a silicon atom, each $R^2$ independently represents a monovalent organic group having a carbon atom bonded directly to a silicon atom, each of m and n independently represents an integer of 0 to 4, each p independently represents an integer of 0 to 2, the number of silicon atoms within one molecule is from 2 to 6, at least one of $R^1$ and $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X), it is preferable that $R^1$ is an oxygen atom, or a divalent organic group in which the total number of carbon atoms and oxygen atoms is at least 4, and each $R^2$ independently represents a methyl group, or a monovalent organic group in which the total number of carbon atoms and oxygen atoms is at least 4.

It is preferable that in general formula (X), $R^1$ is an oxygen atom or an alkylene group having at least 4 carbon atoms, and each $R^2$ independently represents a methyl group, an alkyl group having at least 4 carbon atoms, a carboxylate ester linkage-containing group in which the total number of carbon atoms and oxygen atoms is at least 4, or an aromatic ring-containing group having at least 6 carbon atoms, wherein at least one of $R^1$ and $R^2$ is a group selected from the group consisting of alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, and the total number of carbon atoms and oxygen atoms in one molecule that are contained within all of the alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, is from 4 to 20.

Other examples of the modified silicone oil S include silicone oils represented by general formula (X-1) shown below.

In general formula (X-1), each $R^2$ independently represents a monovalent organic group having a carbon atom bonded directly to a silicon atom, n represents an integer of 0 to 4, each p independently represents 0 or 1, the number of silicon atoms within one molecule is from 2 to 6, at least one $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X-1), it is preferable that each $R^2$ independently represents a methyl group or a monovalent organic group in which the total number of carbon atoms and oxygen atoms is at least 4.

(A) Alkyl-Modified Silicone Oil S

One embodiment of the modified silicone oil S is a compound having 2 to 6 silicon atoms and an alkyl group having at least 4 carbon atoms, and is preferably a compound having a main-chain siloxane linkage, and an alkyl group having at least 4 carbon atoms in which a carbon atom is bonded directly to a silicon atom of the main chain (namely, an alkyl-modified silicone oil S).

In a case in which this compound is used as an ink solvent, when a printed item is stored in a clear file, deformation of the clear file may be prevented.

The main-chain siloxane linkage of the alkyl-modified silicone oil S preferably contains 2 to 6 silicon atoms, more preferably 3 to 5 silicon atoms, and even more preferably 3 silicon atoms. For example, the main-chain siloxane linkage is preferably a trisiloxane (having 3 silicon atoms).

A trimethylsilyloxy group or the like may branch from the main-chain siloxane linkage as a side chain.

The alkyl group having at least 4 carbon atoms may be bonded to the silicon atom at either terminal or to the silicon atoms at both terminals of the main-chain siloxane linkage, may be bonded as a side chain, or may be introduced at one or both terminals and as a side chain.

Examples of the alkyl-modified silicone oil S include the following compounds (1) to (4).

(1) Compounds having an alkyl group having at least 4 carbon atoms at one terminal of the main-chain siloxane linkage.

(2) Compounds having an alkyl group having at least 4 carbon atoms at each of the two terminals of the main-chain siloxane linkage.

(3) Compounds having a single alkyl group having at least 4 carbon atoms as a side chain on the main-chain siloxane linkage.

(4) Compounds having two or more alkyl groups having at least 4 carbon atoms as side chains on the main-chain siloxane linkage.

The alkyl group having at least 4 carbon atoms may be chain-like or alicyclic, and may be a linear or branched alkyl group. The alkyl group having at least 4 carbon atoms preferably has 4 to 20 carbon atoms.

In a case in which the number of carbon atoms in the alkyl group is at least 4, preferably at least 8, and even more preferably 10 or greater, the wetting characteristics of the ink on the nozzle plate may be improved.

In a case in which the number of carbon atoms in the alkyl group is not more than 20, preferably not more than 16, and even more preferably 12 or fewer, clear file deformation may be more easily prevented, any increase in the ink viscosity may be suppressed, and the discharge performance may be improved.

Examples of the alkyl group having at least 4 carbon atoms include an n-butyl group, isobutyl group, tert-butyl group, pentyl group, hexyl group, heptyl group, octyl group, isooctyl group, nonyl group, decyl group, dodecyl group, hexadecyl group and eicosyl group.

Preferred groups include an octyl group, decyl group, dodecyl group and hexadecyl group, and a decyl group or dodecyl group is more preferred.

In the alkyl-modified silicone oil S, the total number of carbon atoms contained in all the alkyl groups of at least 4 carbon atoms in one molecule is preferably at least 4, more preferably at least 8, and even more preferably 10 or greater. This enables ink wetting of the nozzle plate surface to be reduced.

In the alkyl-modified silicone oil S, the total number of carbon atoms contained in all the alkyl groups of at least 4 carbon atoms in one molecule is preferably not more than 20, more preferably not more than 16, and even more preferably 12 or fewer. This ensures a lower ink viscosity, meaning the discharge performance can be improved.

In those cases where one molecule of the alkyl-modified silicone oil S contains two or more alkyl groups of at least 4 carbon atoms, the total number of carbon atoms contained in all the alkyl groups of at least 4 carbon atoms in one molecule means the total number of carbon atoms in the two or more alkyl groups of at least 4 carbon atoms.

Examples of the alkyl-modified silicone oil S include compounds represented by general formula (A1) shown below.

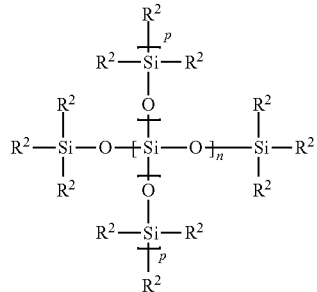

General formula (A1)

In general formula (A1), each $R^2$ independently represents a methyl group or an alkyl group having at least 4 carbon atoms, n represents an integer of 0 to 4, each p independently represents 0 or 1, the number of silicon atoms within one molecule is from 2 to 6, at least one $R^2$ is an alkyl group having at least 4 carbon atoms, and the total number of carbon atoms contained within all of the alkyl groups having at least 4 carbon atoms is from 4 to 20 within one molecule.

In the alkyl-modified silicone oil S, the main chain preferably has 3 silicon atoms, and for example, a trisiloxane compound represented by general formula (A2) shown below can be used.

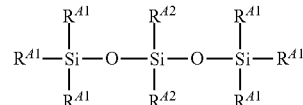

General formula (A2)

In general formula (A2), $R^{A1}$ represents a methyl group or an alkyl group having at least 4 carbon atoms, $R^{A2}$ represents a methyl group, an alkyl group having at least 4 carbon atoms or a trimethylsilyloxy group, at least one $R^{A1}$ or $R^{A2}$ represents an alkyl group having at least 4 carbon atoms, the $R^{A1}$ groups and $R^{A2}$ groups may all be the same, some may be different, or all may be mutually different, and the number of silicon atoms within one molecule is from 2 to 6.

For example, compounds represented by general formula (1) shown below can be used as the alkyl-modified silicone oil S.

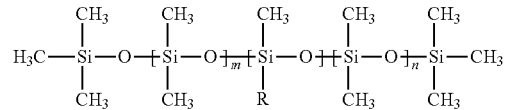

(1)

In general formula (1), R represents a linear or branched alkyl group having 4 to 20 carbon atoms, and each of m and n independently represents an integer of 0 to 2, provided that m+n≤2.

In general formula (1), R represents a linear or branched alkyl group having 4 to 20 carbon atoms. In a case in which the number of carbon atoms in the alkyl group represented by R is at least 4, preferably at least 8, and even more preferably 10 or greater, the wetting characteristics of the ink on the nozzle plate may be improved. In particular, in a case in which a number of carbon atoms of 10 or greater, the surface tension may increase, thereby improving the wetting characteristics.

In a case in which the number of carbon atoms in the alkyl group represented by R is not more than 20, preferably not more than 16, and even more preferably 12 or fewer, clear file deformation may be more easily prevented, any increase in the ink viscosity can be suppressed, and the discharge performance can be improved.

In general formula (1), examples of the alkyl group represented by R include an n-butyl group, isobutyl group, tert-butyl group, pentyl group, hexyl group, heptyl group, octyl group, isooctyl group, nonyl group, decyl group, dodecyl group, hexadecyl group and eicosyl group.

Preferred alkyl groups include an octyl group, decyl group, dodecyl group and hexadecyl group, and a decyl group or dodecyl group is more preferred.

The compound represented by general formula (1) is preferably a compound shown below in which both m and n are 0. R is as described above.

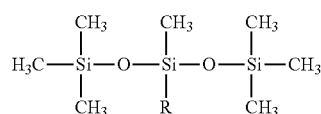

The alkyl-modified silicone oil S described above can be produced using the method described below, but the invention is not restricted to this particular method.

For example, an alkyl-modified silicone oil can be obtained by reacting a siloxane raw material and an alkene having at least 4 carbon atoms in an organic solvent. The siloxane raw material and the alkene are preferably reacted in a molar ratio within a range from 1:1 to 1:1.5. When two or more alkyl groups are to be introduced into the siloxane skeleton, the reaction is preferably performed with a molar ratio between the reactive groups in the siloxane raw material and the alkene that is within a range from 1:1 to 1:1.5. During the reaction, a catalyst such as a platinum catalyst like a zero-valent platinum olefin complex, a zero-valent platinum vinylsiloxane complex, a divalent platinum olefin complex halide or platinic chloride can be used favorably.

For example, by reacting a compound of general formula (1) in which R represents a hydrogen atom as the siloxane raw material, and a linear or branched alkene having 4 to 20 carbon atoms in an organic solvent, a compound represented by general formula (1) can be obtained.

Examples of compounds that can be used as the siloxane raw material include 1,1,1,3,5,5,5-heptamethyltrisiloxane, 1,1,1,3,3,5,7,7,7-nonamethyltetrasiloxane, 1,1,1,3,3,5,7,7,9,9,9-undecamethylpentasiloxane, pentamethyldisiloxane, 1,1,3,3,5,5,5-heptamethyltrisiloxane, 1,1,3,3-tetramethyldisiloxane, 1,1,3,3,5,5-hexamethyltrisiloxane, 1,1,3,3,5,5,7,7-octamethyltetrasiloxane, 1,1,3,3,5,5,7,7,9,9-decamethylpentasiloxane, 1,1,1,5,5,5-hexamethyl-3-(trimethylsilyloxy)trisiloxane, 1,1,1,5,5,5-hexamethyltrisiloxane, 1,1,1,3,5,7,7,7-octamethyltetrasiloxane, 1,1,3,5,5-pentamethyl-3-(dimethylsilyloxy)trisiloxane, and 1,1,3,3,5,5,7,7,9,9,11,11-dodecamethylhexasiloxane.

Examples of alkenes that may be used include 1-butene, 2-butene, 1-pentene, 1-hexene, 1-heptene, 1-octene, 2-octene, 1-nonene, 1-decene, 1-dodecene, 1-hexadecene and 1-eicosene.

Besides alkenes, alicyclic hydrocarbons having an ethylenic unsaturated double bond such as vinylcyclohexane can be used.

(B) Ester-Modified Silicone Oil S

One embodiment of the modified silicone oil S is a compound having 2 to 6 silicon atoms and a carboxylate ester linkage-containing group in which the total number of carbon atoms and oxygen atoms is at least 4, and is preferably a compound having a main-chain siloxane linkage, and a carboxylate ester linkage-containing group in which a carbon atom is bonded directly to a silicon atom of the main chain and in which the total number of carbon atoms and oxygen atoms is at least 4 (namely, an ester-modified silicone oil S).

In a case in which this compound is used as an ink solvent, when a printed item is stored in a clear file, deformation of the clear file may be prevented.

The main-chain siloxane linkage of the ester-modified silicone oil S preferably contains 2 to 6 silicon atoms, more preferably 2 to 5 silicon atoms, and even more preferably 3 to 5 silicon atoms. For example, the main-chain siloxane linkage is preferably a trisiloxane (having 3 silicon atoms). A trimethylsilyloxy group or the like may branch from the main-chain siloxane linkage as a side chain.

The carboxylate ester linkage-containing group may be bonded to the silicon atom at either terminal or to the silicon atoms at both terminals of the main-chain siloxane linkage, may be bonded as a side chain, or may be introduced at one or both terminals and as a side chain.

A group represented by $-R^{Bb}-O-(CO)-R^{Ba}$ or a group represented by $-R^{Bb}-(CO)-O-R^{Ba}$, in which the carboxylate ester linkage is bonded to a silicon atom of the main-chain siloxane linkage via an alkylene group, can be used favorably as the carboxylate ester linkage-containing group.

Here, $R^{Ba}$ is preferably a chain-like or alicyclic alkyl group having at least 1 carbon atom, which may be a linear or branched alkyl group. $R^{Bb}$ is preferably a chain-like or alicyclic alkylene group having at least 1 carbon atom, which may be a linear or branched alkylene group. The alkylene group linking the silicon atom of the main-chain siloxane linkage and the carboxylate ester linkage more preferably has at least 2 carbon atoms.

The total number of carbon atoms and oxygen atoms in the carboxylate ester linkage-containing group is the total of the one carbon atom and two oxygen atoms in the ester linkage ($-O-(CO)-$), the number of carbon atoms in the alkyl group ($R^{Ba}$), and the number of carbon atoms in the alkylene group ($R^{Bb}$).

The total number of carbon atoms and oxygen atoms in the carboxylate ester linkage-containing group is preferably from 4 to 20.

In a case in which the total number of carbon atoms and oxygen atoms in the carboxylate ester linkage-containing group is at least 4, preferably at least 8, and more preferably 10 or greater, the wetting characteristics of the ink on the nozzle plate may be improved.

In a case in which the total number of carbon atoms and oxygen atoms in the carboxylate ester linkage-containing group is not more than 20, preferably not more than 16, and even more preferably 12 or fewer, clear file deformation may be more easily prevented, any increase in the ink viscosity may be suppressed, and the discharge performance may be improved.

In the carboxylate ester linkage-containing group, examples of the alkyl group ($R^{Ba}$) include a methyl group, ethyl group, propyl group, isopropyl group, n-butyl group, isobutyl group, tert-butyl group, pentyl group, hexyl group, heptyl group, octyl group, isooctyl group, nonyl group, decyl group, dodecyl group, hexadecyl group and heptadecyl group.

Preferred alkyl groups include a pentyl group, heptyl group, nonyl group and tridecyl group, and a heptyl group or nonyl group is more preferred.

In the carboxylate ester linkage-containing group, the alkylene group ($R^{Bb}$) is preferably a linear alkylene group having 1 to 8 carbon atoms, and examples include a methylene group, ethylene group, propylene group, trimethylene group, n-butylene group, isobutylene group, pentylene group, hexylene group, heptylene group, octylene group and isooctylene group. An ethylene group is preferred.

In the ester-modified silicone oil S, the total number of carbon atoms and oxygen atoms, contained in all the carboxylate ester linkage-containing groups in which the total number of carbon atoms and oxygen atoms is at least 4, is preferably at least 4 in one molecule, and is more preferably at least 8, and even more preferably 10 or greater, in one molecule. This may enable ink wetting of the nozzle plate surface to be reduced.

In the ester-modified silicone oil S, the total number of carbon atoms and oxygen atoms, contained in all the carboxylate ester linkage-containing groups in which the total number of carbon atoms and oxygen atoms is at least 4, is preferably not more than 20 in one molecule, more preferably not more than 16, and even more preferably 12 or fewer, in one molecule. This may ensure a lower ink viscosity, meaning the discharge performance can be improved.

In those cases where one molecule of the ester-modified silicone oil S contains two or more carboxylate ester linkage-containing groups each having a total number of carbon atoms and oxygen atoms of at least 4, the total number of carbon atoms and oxygen atoms contained in all the carboxylate ester linkage-containing groups in one molecule means the total number of carbon atoms and oxygen atoms in the two or more carboxylate ester linkage-containing groups.

Examples of compounds that can be used favorably as the ester-modified silicone oil S include compounds of the above general formula (X-1) in which each $R^2$ independently represents a methyl group or a carboxylate ester linkage-containing group in which a carbon atom is bonded directly to a silicon atom and in which the total number of carbon atoms and oxygen atoms is at least 4, n represents an integer of 0 to 4, each p independently represents 0 or 1, the number of silicon atoms within one molecule is from 2 to 6, at least one $R^2$ is an aforementioned carboxylate ester linkage-containing group, and the total number of carbon atoms and oxygen atoms contained within all of the carboxylate ester linkage-containing groups within one molecule is from 4 to 20.

Examples of the ester-modified silicone oil S include compounds represented by general formula (B1) shown below.

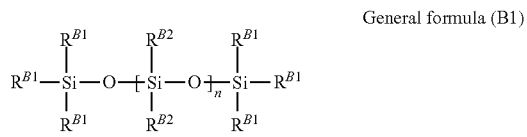

General formula (B1)

In general formula (B1), each $R^{B1}$ independently represents a methyl group or a carboxylate ester linkage-containing group in which a carbon atom is bonded directly to the silicon atom and in which the total number of carbon atoms and oxygen atoms is at least 4, each $R^{B2}$ independently represents a methyl group, a trimethylsilyloxy group, or a carboxylate ester linkage-containing group in which a carbon atom is bonded directly to the silicon atom and in which the total number of carbon atoms and oxygen atoms is at least 4, at least one $R^{B1}$ or $R^{B2}$ is an aforementioned carboxylate ester linkage-containing group in which the total number of carbon atoms and oxygen atoms is at least 4, n represents an integer of 0 to 4, and the number of silicon atoms within one molecule is from 2 to 6.

The carboxylate ester linkage-containing group is as described above.

The ester-modified silicone oil S described above can be produced using the method described below, but the invention is not restricted to this particular method.

For example, the ester-modified silicone oil S can be obtained by reacting a siloxane raw material and a vinyl ester of an aliphatic acid or an allyl ester of an aliphatic acid in which the total number of carbon atoms and oxygen atoms is at least 4 in an organic solvent. The siloxane raw material and the vinyl ester of an aliphatic acid or allyl ester of an aliphatic acid are preferably reacted with a molar ratio between the reactive group in the siloxane raw material and the vinyl ester of an aliphatic acid or allyl ester of an aliphatic acid that is within a range from 1:1 to 1:1.5. During the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil S can be used.

Examples of vinyl esters of aliphatic acids that may be used include vinyl acetate, vinyl propionate, vinyl butyrate, vinyl isobutanoate, vinyl pentanoate, vinyl pivalate, vinyl hexanoate, vinyl heptanoate, vinyl 2-ethylhexanoate, vinyl octanoate, vinyl isooctanoate, vinyl nonanoate, vinyl decanoate, vinyl laurate, vinyl myristate, vinyl palmitate and vinyl eicosanoate, whereas an example of an allyl ester of an aliphatic acid that may be used is allyl hexanoate.

(C) Aryl-Modified Silicone Oil S

One embodiment of the modified silicone oil S is a compound having 2 to 6 silicon atoms and an aromatic ring-containing group having a total number of carbon atoms of at least 6, and is preferably a compound having a main-chain siloxane linkage, and an aromatic ring-containing group in which a carbon atom is bonded directly to a silicon atom of the main chain and in which the total number of carbon atoms is at least 6 (namely, an aryl-modified silicone oil S).

In a case in which this compound is used as an ink solvent, when a printed item is stored in a clear file, deformation of the clear file may be prevented.

Aromatic rings have higher boiling points than linear alkanes having the same number of carbon atoms, and are less likely to volatilize. Moreover, in the aryl-modified silicone oil S, because an aromatic ring that is bulkier than an alkyl group exists within the molecule, following printing of the ink to a recording medium, even if the solvent component were to volatilize from the printed item while stored in a clear file, permeation of the solvent component into the clear file is less likely, meaning deformation of the clear file may be further reduced.

The siloxane linkage of the main chain of the aryl-modified silicone oil S preferably contains 2 to 6 silicon atoms, more preferably 3 to 5 silicon atoms, and even more preferably 3 silicon atoms. For example, the main-chain siloxane linkage is preferably a trisiloxane (having 3 silicon atoms).

A trimethylsilyloxy group or the like may branch from the main-chain siloxane linkage as a side chain.

The aromatic ring-containing group may be bonded to the silicon atom at either terminal or to the silicon atoms at both terminals of the main-chain siloxane linkage, may be bonded as a side chain, or may be introduced at one or both terminals and as a side chain.

A group represented by —$R^{Ca}$ in which the aromatic ring is bonded directly to a silicon atom of the main-chain siloxane linkage, or a group represented by —$R^{Cb}$—$R^{Ca}$, which the aromatic ring is bonded to a silicon atom of the main-chain siloxane linkage via an alkylene group, can be used favorably as the aromatic ring-containing group.

Here, $R^{Ca}$ is preferably an aromatic ring having at least 6 carbon atoms. $R^{Cb}$ is preferably a chain-like or alicyclic alkylene group having at least 1 carbon atom, which may be a linear or branched alkylene group.

When the aromatic ring-containing group is a group represented by —$R^{Ca}$ in which the aromatic ring is bonded directly to a silicon atom of the main-chain siloxane linkage, it is preferable that a trimethylsilyloxy group or the like branches from the main-chain siloxane linkage as a side chain. It is even more preferable that the aromatic ring-containing group is a group represented by —$R^{Cb}$—$R^{Ca}$ in which the aromatic ring is bonded to a silicon atom of the main-chain siloxane linkage via an alkylene group.

The number of carbon atoms in the aromatic ring-containing group is the total of the number of carbon atoms in the aromatic ring ($R^{Ca}$) and the number of carbon atoms in the optional alkylene group ($R^{Cb}$).

The number of carbon atoms in the aromatic ring-containing group is preferably from 6 to 20.

In a case in which the number of carbon atoms in the aromatic ring-containing group is at least 6, preferably at least 8, and more preferably 10 or greater, the wetting characteristics of the ink on the nozzle plate may be improved.

In a case in which the number of carbon atoms in the aromatic ring-containing group is not more than 20, preferably not more than 16, and more preferably 12 or fewer, clear file deformation may be more easily prevented, any increase in the ink viscosity may be suppressed, and the discharge performance may be improved.

In the aromatic ring-containing group, examples of the aromatic ring portion ($R^{Ca}$) include a phenyl group, tolyl group, xylyl group, trimethylphenyl group, biphenylyl group, naphthyl group or anthracenyl group, or a functional group in which at least one hydrogen atom of one of these groups has been substituted with an alkyl group.

The aromatic ring-containing group may contain one, or two or more aromatic rings, but the total number of carbon atoms in all of the aromatic ring-containing groups of at least 6 carbon atoms in one molecule is preferably from 6 to 20.

In the aromatic ring-containing group, the optional alkylene group ($R^{Cb}$) is preferably a linear or branched alkylene group having 1 to 8 carbon atoms, and examples include a methylene group, ethylene group, propylene group, trimethylene group, n-butylene group, isobutylene group, pentylene group, hexylene group, heptylene group, octylene group and isooctylene group.

A propylene group, methylethylene group or ethylene group is preferred.

In the aryl-modified silicone oil S, the total number of carbon atoms contained in all the aromatic ring-containing groups of at least 6 carbon atoms in one molecule is preferably at least 6, more preferably at least 8, and even more preferably 10 or greater. This may enable ink wetting of the nozzle plate surface to be reduced.

In the aryl-modified silicone oil S, the total number of carbon atoms contained in all the aromatic ring-containing groups of at least 6 carbon atoms in one molecule is preferably not more than 20, more preferably not more than 16, and even more preferably 12 or fewer. This may ensure a lower ink viscosity, meaning the discharge performance can be improved.

In those cases where one molecule of the aryl-modified silicone oil S contains two or more aromatic ring-containing groups of at least 6 carbon atoms, the total number of carbon atoms contained in all the aromatic ring-containing groups of at least 6 carbon atoms in one molecule means the total number of carbon atoms in the two or more aromatic ring-containing groups of at least 6 carbon atoms.

Examples of compounds that can be used favorably as the aryl-modified silicone oil S include compounds of the above general formula (X-1) in which each $R^2$ independently represents a methyl group or an aromatic ring-containing group having at least 6 carbon atoms in which a carbon atom is bonded directly to the silicon atom, n represents an integer of 0 to 4, each p independently represents 0 or 1, the number of silicon atoms within one molecule is from 2 to 6, at least one $R^2$ is an aforementioned aromatic ring-containing group, and the total number of carbon atoms contained within all of the aromatic ring-containing groups within one molecule is from 6 to 20.

Examples of the aryl-modified silicone oil S include compounds represented by general formula (C1) shown below.

General formula (C1)

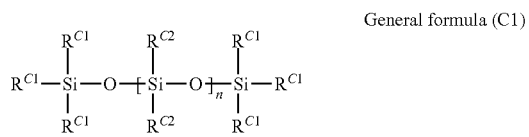

In general formula (C1), each $R^{C1}$ independently represents a methyl group or an aromatic ring-containing group of at least 6 carbon atoms in which a carbon atom is bonded directly to the silicon atom, each $R^{C2}$ independently represents a methyl group, a trimethylsilyloxy group, or an aromatic ring-containing group having at least 6 carbon atoms in which a carbon atom is bonded directly to the silicon atom, at least one $R^{C1}$ or $R^{C2}$ is an aforementioned aromatic ring-containing group having at least 6 carbon atoms, n represents an integer of 0 to 4, and the number of silicon atoms within one molecule is from 2 to 6.

The aromatic ring-containing group is as described above.

In the general formula (C1), compounds having a trisiloxane skeleton in which n=1 are preferred.

The aryl-modified silicone oil S described above can be produced using the method described below, but the invention is not restricted to this particular method.

For example, an aryl-modified silicone oil S can be obtained by reacting a siloxane raw material and an aryl compound of 6 to 20 carbon atoms having a carbon double bond in an organic solvent. The siloxane raw material and the aryl compound are preferably reacted with a molar ratio between the reactive group in the siloxane raw material and the carbon double bond in the aryl compound that is within a range from 1:1 to 1:1.5. During the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil S can be used.

Examples of aryl compounds having a carbon double bond that may be used include styrene, 4-methylstyrene, 2-methylstyrene, 4-tert-butylstyrene, allylbenzene, 1-allylnaphthalene, 4-phenyl-1-butene, 2,4-diphenyl-4-methyl-1-pentene, 1-vinylnaphthalene, α-methylstyrene, 2-methyl-1-phenylpropene, 1,1-diphenylethylene, triphenylethylene, 2,4,6-trimethylstyrene, cis-β-methylstyrene, trans-β-methylstyrene, and 3-phenyl-1-propene.

(D) Alkylene-Modified Silicone Oil S

One embodiment of the modified silicone oil S is a compound having 2 to 6 silicon atoms and an alkylene group having at least 4 carbon atoms, and is preferably a compound having a siloxane linkage bonded to the carbon atom at one terminal of an alkylene group having at least 4 carbon atoms, and having a silyl group or a siloxane linkage bonded to the carbon atom at the other terminal of the alkylene group (namely, an alkylene-modified silicone oil S).

In a case in which this compound is used as an ink solvent, when a printed item is stored in a clear file, deformation of the clear file may be prevented.

The alkylene-modified silicone oil S preferably contains 2 to 6 silicon atoms, more preferably 3 to 5 silicon atoms, and even more preferably 4 silicon atoms.

In the alkylene-modified silicone oil S, the silyl group or siloxane linkage at one terminal of the alkylene group preferably contains 1 to 5 silicon atoms, more preferably 1 to 4 silicon atoms, and even more preferably 2 or 3 silicon atoms.

When the alkylene-modified silicone oil S has a siloxane linkage having 3 or more silicon atoms at one terminal of the alkylene group, a trimethylsilyloxy group or the like may branch from the main-chain siloxane linkage as a side chain.

The alkylene group having at least 4 carbon atoms may be chain-like or alicyclic, and may be a linear or branched alkylene group. The alkylene group having at least 4 carbon atoms preferably has 4 to 20 carbon atoms.

In a case in which the number of carbon atoms in the alkylene group is at least 4, and preferably at least 8, the wetting characteristics of the ink on the nozzle plate may be improved.

In a case in which the number of carbon atoms in the alkylene group is not more than 20, preferably not more than 12, and even more preferably 10 or fewer, clear file deformation may be more easily be prevented, any increase in the ink viscosity may be suppressed, and the discharge performance may be improved.

Examples of the alkylene group having at least 4 carbon atoms include an n-butylene group, isobutylene group, pentylene group, hexylene group, heptylene group, octylene group, isooctylene group, nonylene group, decylene group, dodecylene group, hexadecylene group and eicosylene group. An octylene group, decylene group or dodecylene group is preferred, and an octylene group or decylene group is more preferred.

Examples of compounds that can be used favorably as the alkylene-modified silicone oil S include compounds of the above general formula (X) in which $R^1$ represents an alkylene group having at least 4 carbon atoms, $R^2$ represents a methyl group, each of m and n independently represents an integer of 0 to 4, each p independently represents an integer of 0 to 2, and the number of silicon atoms within one molecule is from 2 to 6.

Examples of the alkylene-modified silicone oil S include compounds represented by general formula (D1) shown below.

In general formula (D1), $R^{D1}$ represents an alkylene group having at least 4 carbon atoms, each of a and f independently represents an integer of 0 to 2, each of b and e independently represents an integer of 0 or 1, and each of c and d independently represents an integer of 0 or 1, provided that $a+b+c \leq 2$ and $d+e+f \leq 2$, and the number of silicon atoms within one molecule is from 2 to 6.

In general formula (D1), it is preferable that $1 \leq a+b+c \leq 2$ and $1 \leq d+e+f \leq 2$.

In general formula (D1), it is preferable that $R^{D1}$ is an alkylene group having 8 to 10 carbon atoms.

The alkylene-modified silicone oil S described above can be produced using the method described below, but the invention is not restricted to this particular method.

For example, an alkylene-modified silicone oil can be obtained by reacting a siloxane raw material and a diene compound having 4 to 20 carbon atoms in an organic solvent. The siloxane raw material and the diene compound are preferably reacted in a molar ratio within a range from 2:1 to 3:1. During the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil S can be used.

Examples of diene compounds that may be used include 1,3-butadiene, 1,3-pentadiene, 1,4-pentadiene, 1,5-hexadiene, 1,6-heptadiene, 1,7-octadiene, 1,8-nonadiene, 1,9-decadiene, 1,11-dodecadiene, 1,10-undecadiene, 1,13-tetradecadiene, hexadecadiene, and eicosadiene.

Commercially available products may be used as the modified silicone oil S, and examples of products that may be used include alkyl-modified silicone oils such as "FZ-3196" manufactured by Dow Corning Toray Co., Ltd., and aryl-modified silicone oils such as "1,1,1,5,5,5-hexamethyl-3-phenyl-3-(trimethylsilyloxy)trisiloxane" manufactured by Tokyo Chemical Industry Co., Ltd.

A single silicone oil may be used alone, or a combination of a plurality of silicone oils may be used.

From the viewpoints of preventing clear file deformation, improving the image density of black images immediately after printing, and suppressing any deterioration in the image density of black images over time, the amount of the silicone oil in the ink A, relative to the total mass of non-aqueous solvent in the ink A, is preferably at least 15% by mass, more preferably at least 20% by mass, even more preferably at least 25% by mass, even more preferably at least 30% by mass, even more preferably at least 40% by mass, and even more preferably 50% by mass or greater.

General formula (D1)

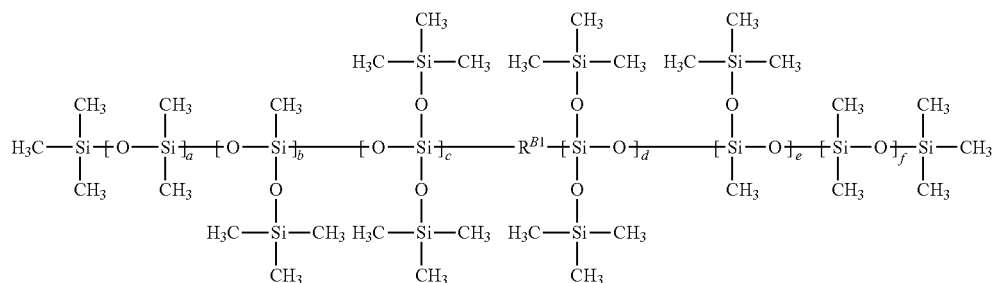

The amount of the silicone oil in the ink A, relative to the total mass of non-aqueous solvent in the ink A, may be 100% by mass. The amount of the silicone oil in the ink A relative to the total mass of non-aqueous solvent in the ink A may be not more than 90% by mass.

The amount of the silicone oil in the ink A, relative to the total mass of non-aqueous solvent, may be, for example, from 15% by mass to 100% by mass, more preferably from 20% by mass to 100% by mass, even more preferably from 25% by mass to 90% by mass, even more preferably from 30% by mass to 90% by mass, even more preferably from 40% by mass to 90% by mass, and even more preferably from 50% by mass to 90% by mass.

The amount of the silicone oil in the ink A relative to the total mass of the ink A varies depending on the total amount of non-aqueous solvent used, but from the viewpoints of preventing clear file deformation, improving the image density of black images immediately after printing, and suppressing any deterioration in the image density of black images over time, the amount of the silicone oil is, for example, preferably at least 12% by mass, more preferably at least 20% by mass, even more preferably at least 30% by mass, even more preferably at least 40% by mass, and even more preferably 50% by mass or greater.

The amount of the silicone oil in the ink A relative to the total mass of the ink A may be, for example, not more than 95% by mass, and may be 90% by mass or less.

The amount of the silicone oil in the ink A, relative to the total mass of the ink, may be, for example, from 12% by mass to 95% by mass, more preferably from 20% by mass to 95% by mass, even more preferably from 30% by mass to 90% by mass, even more preferably from 40% by mass to 90% by mass, and even more preferably from 50% by mass to 90% by mass.

The ink A may also contain one or more other non-aqueous solvents.

Both non-polar organic solvents and polar organic solvents can be used as these other non-aqueous solvents. In the embodiments of the present invention, a water-insoluble organic solvent that does not mix uniformly with an equal volume of water at 1 atmosphere and 20° C. is preferably used as this other non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents, higher alcohol-based solvents and higher fatty acid-based solvents.

Specific examples include fatty acid ester-based solvents having at least 13 carbon atoms, and preferably 16 to 30 carbon atoms, within one molecule, such as isononyl isononanoate, isodecyl isononanoate, isotridecyl isononanoate (22 carbon atoms), methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate;

higher alcohol-based solvents having at least 6 carbon atoms, and preferably 12 to 20 carbon atoms, within one molecule, such as isomyristyl alcohol, isopalmityl alcohol, stearyl alcohol (1-octadecanol), isostearyl alcohol, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or a combination of two or more solvents may be used, provided the solvents form a single phase.

The ink A preferably contains a polar component. Examples of this polar component include polar solvents such as polar organic solvents. For example, the ink A preferably includes an aforementioned polar organic solvent in the non-aqueous solvent. Fatty acid ester-based solvents and higher alcohol-based solvents are more preferable as the polar organic solvent. For example, the ink A preferably contains at least one solvent selected from the group consisting of fatty acid ester-based solvents and higher alcohol-based solvents. In a case in which the ink A contains a polar component such as a polar solvent, the image density immediately after printing tends to improve, and the ink repellency of the nozzle plate also tends to be further enhanced. Although not constrained by any particular theory, the reasons for this are thought to include the following.

Polar components tend to have a high surface tension, and tend to exhibit good compatibility with pigments and pigment dispersants. Accordingly, when the ink A includes a polar component, the pigment and the pigment dispersant, together with the polar component, tend to be retained on the upper layer of the recording medium more readily than the silicone oil, yielding an improvement in the image density. If there is a difference between the surface tension of the silicone oil and the surface tension of the polar component, then the image density can be more easily improved. Further, the polar component tends to have a high surface tension, and the polar groups may improve the ink repellency.

For example, when the ink A includes a polar organic solvent, it is preferable that the surface tension of the silicone oil is lower than the surface tension of the polar organic solvent.

When the ink A includes a polar organic solvent, the amount of the polar organic solvent, relative to the total mass of non-aqueous solvent in the ink A, is preferably from 2 to 85% by mass, more preferably from 5 to 80% by mass, and even more preferably from 10 to 75% by mass.

The ink A may contain at least one solvent selected from the group consisting of fatty acid ester-based solvents and higher alcohol-based solvents in an amount of 2 to 85% by mass (more preferably from 5 to 80% by mass, and even more preferably from 10 to 75% by mass) relative to the total mass of non-aqueous solvent in the ink A.

In the ink A, the total amount of the silicone oil and the polar organic solvent, relative to the total mass of non-aqueous solvent in the ink A, is preferably at least 50% by mass, more preferably at least 60% by mass, and even more preferably 80% by mass or greater. The total amount of the silicone oil and the polar organic solvent may, for example, represent 100% by mass of the total mass of non-aqueous solvent in the ink A.

In the ink A, the amount of petroleum-based hydrocarbon solvents, relative to the total mass of non-aqueous solvent in the ink A, is preferably not more than 85% by mass, more preferably not more than 80% by mass, even more preferably not more than 75% by mass, even more preferably not more than 70% by mass, even more preferably not more than 60% by mass, even more preferably less than 50% by mass, even more preferably not more than 40% by mass, and even more preferably not more than 20% by mass, and may, for example, be 0% by mass.

In addition to the components described above, the ink A may also include one or more of various additives, provided these additives do not impair the effects of the present invention. For example, one or more additives, examples of which include nozzle blockage inhibitors, antioxidants, conductivity modifiers, viscosity modifiers, surface tension regulators, and oxygen absorbers and the like, may be added as appropriate. There are no particular limitations on the types of these additives, and materials typically used in this technical field may be used.

The ink A can be produced by mixing the various components including the colorant and the non-aqueous solvent.

The ink A is preferably produced by mixing and stirring the components together, either in a single batch or in a number of separate batches. Specifically, the ink A can be produced by dispersing all of the components in a dispersion device such as a beads mill, either in a single batch or in a number of separate batches, and then, if desired, passing the resulting dispersion through a filtration device such as a membrane filter.

The ideal range for the viscosity of the ink A varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and even more preferably about 10 mPa·s.

The ink B is described below.

The ink B is a color ink and contains a pigment, a pigment dispersant and a non-aqueous solvent.

Examples of inks that may be used as the color ink include colored inks other than black ink, such as magenta inks, cyan inks, yellow inks, light magenta inks, deep red inks and light cyan inks.

The ink B is preferably a cyan ink. In general, the density of black appears greater when a black ink is mixed with a color ink due to the theory of subtractive color mixing, and this effect tends to be greater when a cyan ink is used as the color ink than when a yellow ink or magenta ink is used.

The ink B may contain a pigment as a colorant. Examples of the pigment include the pigments listed above for the ink A. These pigments may be used individually, or a combination of two or more pigments may be used.

Examples of preferred pigments for the ink B include organic pigments such as azo pigments, phthalocyanine pigments, polycyclic pigments and dye lake pigments; and inorganic pigments such as metal oxides. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the metal oxides include titanium oxide and zinc oxide.

The ink B preferably contains a phthalocyanine pigment (and more preferably a metal phthalocyanine pigment).

With respect to the preferred dispersed form, average particle diameter, and amount of the pigment, the descriptions presented above for the ink A may also apply to the ink B. Examples of the pigment dispersant which may be used in the ink B include the pigment dispersants described for the ink A. With respect to the preferred amount of the pigment dispersant, the descriptions presented above for the ink A may also apply to the ink B.

The ink B preferably contains a petroleum-based hydrocarbon solvent. The petroleum-based hydrocarbon solvent described above for the ink A may be used as the petroleum-based hydrocarbon solvent.

The surface tension of the petroleum-based hydrocarbon solvent included in the ink B is preferably higher than the surface tension of the silicone oil included in the ink A. The surface tension of the petroleum-based hydrocarbon solvent included in the ink B is, for example, preferably 23 mN/m or higher.

In the ink B, a single petroleum-based hydrocarbon solvent may be used alone, or a combination of a plurality of such solvents may be used.

From the viewpoint of improving the ink repellency of the nozzle plate, the amount of the petroleum-based hydrocarbon solvent in the ink B, relative to the total mass of non-aqueous solvent in the ink B, is preferably at least 50% by mass, more preferably at least 60% by mass, even more preferably at least 70% by mass, and even more preferably 80% by mass or greater.

The amount of the petroleum-based hydrocarbon solvent in the ink B may, for example, represent 100% by mass of the total mass of non-aqueous solvent in the ink B. The amount of the petroleum-based hydrocarbon solvent in the ink B relative to the total mass of non-aqueous solvent in the ink B may be not more than 95% by mass, or 85% by mass or less.

The amount of the petroleum-based hydrocarbon solvent in the ink B, relative to the total mass of non-aqueous solvent in the ink B, may be, for example, from 50% by mass to 100% by mass, more preferably from 60% by mass to 100% by mass, even more preferably from 70% by mass to 95% by mass, even more preferably form 80% by mass to 85% by mass.

The amount of the petroleum-based hydrocarbon solvent in the ink B relative to the total mass of the ink B varies depending on the total amount of non-aqueous solvent used, but is, for example, preferably at least 55% by mass, more preferably at least 60% by mass, and even more preferably 70% by mass or greater.

The amount of the petroleum-based hydrocarbon solvent in the ink B relative to the total mass of the ink B may be, for example, not more than 95% by mass, and may be 80% by mass or less.

The amount of the petroleum-based hydrocarbon solvent in the ink B, relative to the total mass of the ink B, may be, for example, from 55% by mass to 95% by mass, more preferably from 60% by mass to 95% by mass, and even more preferably from 70% by mass to 80% by mass.

The ink B may also contain one or more other non-aqueous solvents. Examples of other non-aqueous solvents that can be included in the ink B include those solvents other than petroleum-based hydrocarbon solvents among the non-aqueous solvents for the ink A described above, such as silicone oils described above for the ink A.

In the ink B, one other non-aqueous solvent may be used alone, or a combination of a plurality of other non-aqueous solvents may be used.

The ink B preferably contains a polar component. Examples of this polar component for the ink B include polar solvents such as the polar organic solvents described above for the ink A. For example, the ink B preferably includes an aforementioned polar organic solvent in the non-aqueous solvent. Fatty acid ester-based solvents and higher alcohol-based solvents are more preferable as the polar organic solvent, and for example, the ink B preferably contains at least one solvent selected from the group consisting of fatty acid ester-based solvents and higher alcohol-based solvents. In a case in which the ink B includes a polar component such as a polar organic solvent, the ink repellency of the nozzle plate tends to be further enhanced.

When the ink B includes a polar organic solvent, the amount of the polar organic solvent, relative to the total mass of non-aqueous solvent in the ink B, is preferably from 2 to 40% by mass, and more preferably from 10 to 35% by mass.

The ink B may contain at least one solvent selected from the group consisting of fatty acid ester-based solvents and higher alcohol-based solvents in an amount of 2 to 40% by mass (and more preferably from 10 to 35% by mass) relative to the total mass of non-aqueous solvent in the ink B.

In the ink B, the amount of silicone oil, relative to the total mass of non-aqueous solvent in the ink B, is preferably not more than 50% by mass, more preferably not more than 40% by mass, even more preferably not more than 30% by mass, even more preferably not more than 20% by mass, even more preferably less than 15% by mass, even more preferably not more than 10% by mass, and even more preferably 5% by mass, and may, for example, be 0% by mass.

The ink B may also include one or more of various additives, provided these additives do not impair the effects of the present invention. Examples of these additives include the additives described for the ink A.

The ink B can be produced using the production method described for the ink A. Further, the preferred viscosity range for the ink B is the same as that for the ink A.

The surface tension of the ink A is preferably at least 19 mN/m but not more than 28 mN/m, more preferably at least 19 mN/m but less than 26 mN/m, and even more preferably at least 20 mN/m but not more than 25 mN/m.

The surface tension of the ink B is preferably at least 25 mN/m but not more than 30 mN/m, more preferably at least 26 mN/m but not more than 30 mN/m, and even more preferably at least 26 mN/m but not more than 28 mN/m.

For example, it is preferable that the surface tension of the ink A is at least 19 mN/m but less than 26 mN/m, and the surface tension of the ink B is at least 26 mN/m but not more than 30 mN/m.

The surface tension of each ink and each solvent can be determined by the maximum bubble pressure method. For example, the surface tension can be measured using the Science Line t60 device manufactured by SITA Process Solutions of SITA Messtechnik GmbH.

The ink set of the first embodiment contains at least the ink A and the ink B.

The ink set of the first embodiment may, for example, contain two or more types of each of the ink A and/or the ink B. If required, the ink set of the first embodiment may also contain other inks and/or treatment liquids and the like.

The ink set of the first embodiment can be used favorably for inkjet printing which includes, using an inkjet head having a first nozzle portion and a second nozzle portion, discharging the oil-based inkjet ink A from the first nozzle portion and discharging the oil-based inkjet ink B from the second nozzle portion to form an image on a recording medium. In a case in which the ink set of the first embodiment is used in this way, the ink repellency of the nozzle plate may be improved.

Because the silicone oil typically has a low surface tension, the nozzle plate of the inkjet head is easily wet, which tends to cause poor ink repellency. However, the petroleum-based hydrocarbon solvent contained in the ink B has a comparatively high surface tension, and tends to exhibit excellent ink repellency. On the other hand, when an inkjet head having a first nozzle portion and a second nozzle portion is used, two or more different liquids can be discharged from the different nozzle portions while using a single inkjet head. When the ink A containing the silicone oil and the ink B containing the petroleum-based hydrocarbon solvent are discharged from this type of inkjet head, the two inks are mixed on the nozzle plate when a nozzle plate wiping operation is performed. Consequently, compared with the case where only an ink containing a silicone oil is used, the ink repellency of the nozzle plate can be improved. By improving the ink repellency of the nozzle plate, ink adhesion to the nozzle heads may be suppressed, meaning the discharge characteristics may also be improved.

Examples of an inkjet head having a first nozzle portion and a second nozzle portion includes an inkjet head in which the first nozzle portion and the second nozzle portion each has a plurality of nozzles arranged linearly along the main scanning direction.

FIG. 1 is a drawing schematically illustrating one example of an inkjet head in which a first nozzle portion and a second nozzle portion each has a plurality of nozzles arranged linearly along the main scanning direction. In FIG. 1, symbol 100 represents the inkjet head, and symbols 10 and 20 each represent a nozzle array composed of a plurality of nozzles arranged linearly along the main scanning direction. The inkjet head of FIG. 1 has these two nozzle arrays as the first nozzle portion and the second nozzle portion, and can form an image on a recording medium, for example, by discharging a first ink from the nozzle array 10 and discharging a second ink from the nozzle array 20.

In FIG. 1, the inkjet head has two nozzle arrays that represent the first nozzle portion and the second nozzle portion, but the inkjet head may also have one or more other discharge portions, and for example, the inkjet head may have three or more nozzle arrays.

Figure 2:
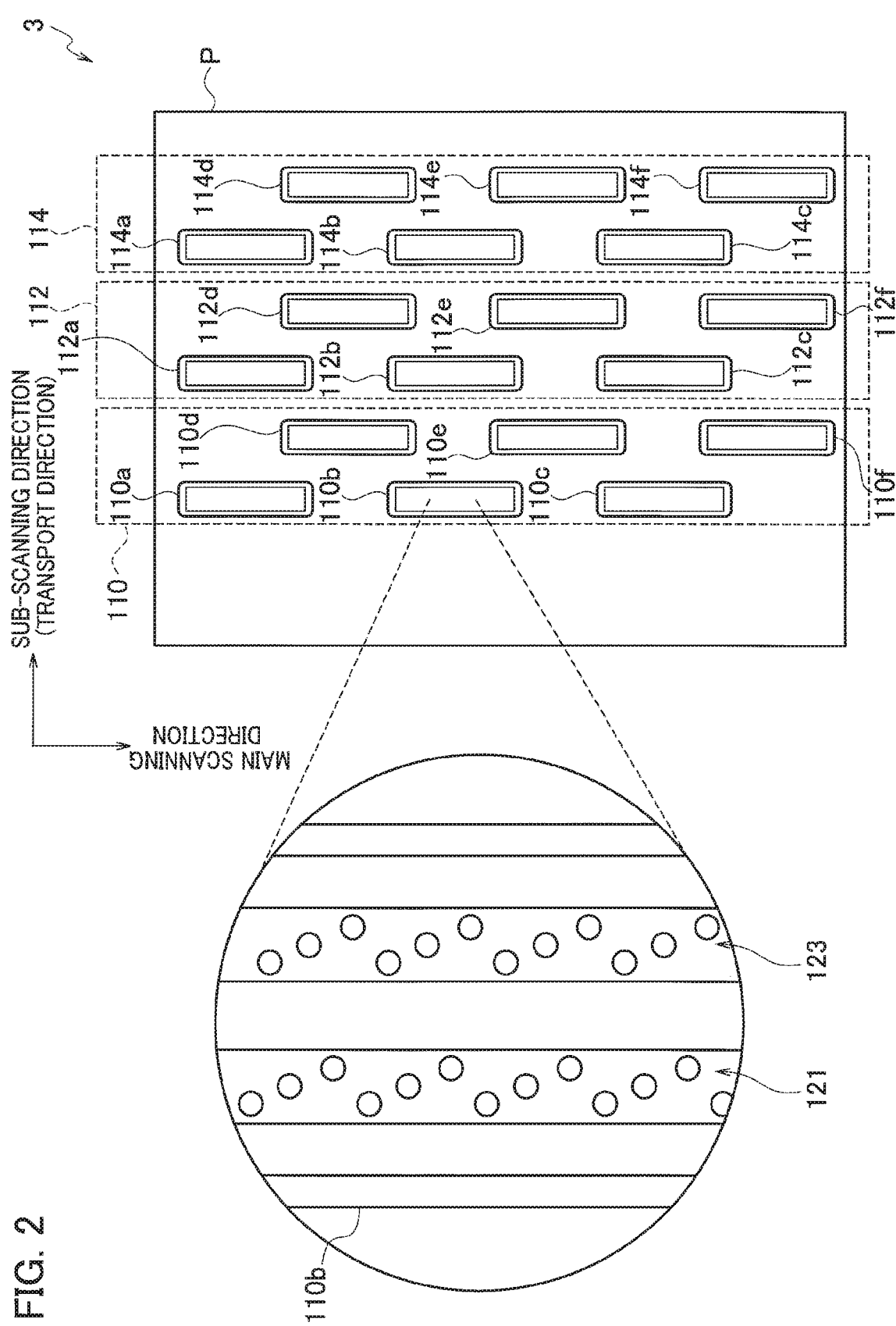
FIG. 2 is a schematic drawing of one example of an inkjet head unit.

Another example of an inkjet head in which the first nozzle portion and the second nozzle portion each have a plurality of nozzles arranged linearly along the main scanning direction is illustrated in FIG. 2. FIG. 2 represents an example of an inkjet head unit containing one example of inkjet heads having two nozzle arrays as the first nozzle portion and the second nozzle portion. In FIG. 2, the inkjet heads have two nozzle arrays on a single nozzle plate surface.

FIG. 2 is described below in further detail. In FIG. 2, the inkjet head unit 3 has a plurality of line-type inkjet heads 110a to 110f, 112a to 112f, and 114a to 114f each having two parallel nozzle arrays arranged linearly along a direction orthogonal to the transport direction for a recording medium P (namely, along the main scanning direction), with each nozzle array being composed of a plurality of nozzles. Each of the inkjet heads 110a to 110f has two nozzle arrays 121 and 123 on one nozzle plate. Similarly, each of the inkjet heads 112a to 112f has two nozzle arrays on one nozzle plate, and each of the inkjet heads 114a to 114f also has two nozzle arrays on one nozzle plate.

In FIG. 2, each of the nozzle arrays 121 and 123 has a plurality of nozzle lines arranged in a zigzag pattern. The two nozzle arrays in each of the inkjet heads 112a to 112f and 114a to 114f have the same structure as the nozzle arrays 121 and 123. In this manner, in each inkjet head, a single nozzle array may be composed of a plurality of nozzle lines arranged in a zigzag pattern, but the invention is not limited to this particular configuration.

In embodiments of the present invention, the inkjet heads may be provided in the type of inkjet head unit illustrated in FIG. 2, but the invention is not limited to this configuration.

Oil-based Inkjet Ink Set of Second Embodiment

The oil-based inkjet ink set of another embodiment of the present invention includes: an oil-based inkjet ink A containing a non-aqueous solvent, the non-aqueous solvent of the oil-based inkjet ink A containing at least 15% by mass of a silicone oil relative to the total mass of the non-aqueous solvent of the oil-based inkjet ink A, and an oil-based inkjet ink B containing a non-aqueous solvent, the non-aqueous solvent of the oil-based inkjet ink B containing at least 50% by mass of a petroleum-based hydrocarbon solvent relative to the total mass of the non-aqueous solvent of the oil-based inkjet ink B, wherein the oil-based inkjet ink set is used for inkjet printing which includes, using an inkjet head having a first nozzle portion and a second nozzle portion, discharging the oil-based inkjet ink A from the first nozzle portion and discharging the oil-based inkjet ink B from the second nozzle portion to form an image on a recording medium. In the following description, this oil-based inkjet ink set is sometimes referred to as the oil-based inkjet ink set of a second embodiment or the ink set of a second embodiment.

Because the oil-based inkjet ink B contains an inexpensive petroleum-based hydrocarbon solvent in an amount of at least 50% by mass relative to the total mass of the non-aqueous solvent, the ink set of the second embodiment may be produced at low cost, meaning printed items may be produced at low cost. Further, according to the ink set of the second embodiment in which the oil-based inkjet ink A contains a silicone oil in an amount of at least 15% by mass relative to the total mass of the non-aqueous solvent of the oil-based inkjet ink A, clear file deformation caused by printed items may be prevented. Moreover, the ink set of the second embodiment is used for inkjet printing which includes, using an inkjet head having a first nozzle portion and a second nozzle portion, discharging the oil-based inkjet ink A from the first nozzle portion and discharging the oil-based inkjet ink B from the second nozzle portion to form an image on a recording medium, and, therefore, the ink A and the ink B can be discharged from a single inkjet head. As a result, when wiping is performed, the ink A containing the silicone oil which tends to have low ink repellency and the ink B containing the petroleum-based hydrocarbon solvent which tends to have high ink repellency are mixed on the nozzle plate surface, enabling the ink repellency of the nozzle plate to be improved compared with the case where only an ink containing a silicone oil is used. By improving the ink repellency of the nozzle plate, ink adhesion to the nozzle heads may be suppressed, meaning the discharge characteristics may also be improved.

The inkjet head having a first nozzle portion and a second nozzle portion, and the formation of an image by discharging the oil-based inkjet ink A from the first nozzle portion and discharging the oil-based inkjet ink B from the second nozzle portion are as described above for a preferred form of the ink set of the first embodiment, and the descriptions presented above for the ink set of the first embodiment may also apply to the ink set of the second embodiment.

In the ink set of the second embodiment, with the exceptions that there are no particular limitations on the colors of the inks A and B, and the fact that each of the inks may contain or does not necessarily contain a pigment and/or a pigment dispersant, the inks A and B may be the same as the inks A and B in the ink set of the first embodiment described above, and the descriptions of the inks A and B in the ink set of the first embodiment may also apply to the inks A and B of the second embodiment.

In the ink set of the second embodiment, the ink A and the ink B may each independently be selected appropriately from among a black ink, a white ink, a color ink, or a transparent ink or the like. Examples of inks that may be used as the color ink include colored inks other than black ink, such as a magenta ink, cyan ink, yellow ink, light magenta ink, deep red ink or light cyan ink. The ink A is preferably a black ink. The ink B is preferably a color ink. It is more preferable that the ink A is a black ink and the ink B is a color ink. Further, the ink A may be a black ink and the ink B may be a cyan ink.

In the ink set of the second embodiment, the inks A and B may each contain a pigment, a dye or a combination thereof as a colorant.

Examples of the pigment include the pigments listed for the ink set of the first embodiment. For each of the inks A and B, with respect to the pigment, and the average particle diameter and amount of the pigment, the descriptions presented above for the ink set of the first embodiment may also apply to the ink set of the second embodiment. The dispersed form of the pigment may include a so-called encapsulated pigment in which the pigment is coated with an oil-insoluble resin, colored resin particles, or a dispersion in which the encapsulated pigment or resin particles are dispersed using a pigment dispersant, but a dispersion of a so-called self-dispersing pigment in which a functional group is chemically bonded to the pigment surface, or a dispersion obtained by adsorbing a pigment dispersant directly to the pigment surface is preferable.

When a pigment is included in the ink, a pigment dispersant may also be included in the ink. With respect to the examples of the pigment dispersant and the amount of the pigment dispersant, the descriptions presented above for the ink set of the first embodiment may also apply to the ink set of the second embodiment.

For the dye, any of the dyes typically used in this technical field may be used. In an oil-based ink, in a case in which a dye exhibits better affinity with the non-aqueous solvent of the ink, storage stability may be improved. Accordingly, the use of an oil-soluble dye is preferred.

Examples of oil-soluble dyes include azo dyes, metal complex salt dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metal phthalocyanine dyes. These dyes may be used individually, or a combination of two or more dyes may be used.

The amount of the dye is typically from 0.01 to 20% by mass relative to the total mass of the ink, and from the viewpoints of print density and ink viscosity, is preferably from 1 to 15% by mass, and more preferably from 5 to 10% by mass.

The ink set of the second embodiment contains at least the ink A and the ink B.

The ink set of the second embodiment may, for example, contain two or more types of each of the ink A and/or the ink B. If required, the ink set of the second embodiment may also contain other inks and/or treatment liquids and the like.

In an embodiment, use of the ink set of the second embodiment in the inkjet printing which includes, using the inkjet head having a first nozzle portion and a second nozzle portion, discharging the oil-based inkjet ink A from the first nozzle portion and discharging the oil-based inkjet ink B from the second nozzle portion to form an image on a recording medium, is also provided.

Method for Producing Printed Item

A method for producing a printed item according of an embodiment may be a method for producing a printed item, including discharging two or more inks onto a recording medium to form an image, wherein the two or more inks include an oil-based inkjet ink A containing a non-aqueous solvent, the non-aqueous solvent of the oil-based inkjet ink A containing at least 15% by mass of a silicone oil relative to the total mass of the non-aqueous solvent of the oil-based inkjet ink A, and an oil-based inkjet ink B containing a non-aqueous solvent, the non-aqueous solvent of the oil-based inkjet ink B containing at least 50% by mass of a petroleum-based hydrocarbon solvent relative to the total mass of the non-aqueous solvent of the oil-based inkjet ink B, and wherein (i) the oil-based inkjet ink A is a black ink and contains a pigment and a pigment dispersant, and the oil-based inkjet ink B is a color ink and contains a pigment and a pigment dispersant, and/or (ii) the method includes, using an inkjet head having a first nozzle portion and a second nozzle portion, discharging the oil-based inkjet ink A from the first nozzle portion and discharging the oil-based inkjet ink B from the second nozzle portion.

Method for Producing Printed Item of First Embodiment

A method for producing a printed item according of an embodiment is a method for producing a printed item, including discharging two or more inks onto a recording medium to form an image, wherein the two or more inks include an oil-based inkjet ink A, which is a black ink and contains a pigment, a pigment dispersant and a non-aqueous solvent, the non-aqueous solvent of the oil-based inkjet ink A containing at least 15% by mass of a silicone oil relative to the total mass of the non-aqueous solvent of the oil-based inkjet ink A, and an oil-based inkjet ink B, which is a color ink and contains a pigment, a pigment dispersant and a non-aqueous solvent, the non-aqueous solvent of the oil-based inkjet ink B containing at least 50% by mass of a petroleum-based hydrocarbon solvent relative to the total mass of the non-aqueous solvent of the oil-based inkjet ink B. In the following description, this method is sometimes referred to as the method for producing a printed item of a first embodiment.

According this method for producing a printed item, because the ink B contains an inexpensive petroleum-based hydrocarbon solvent in an amount of at least 50% by mass relative to the total mass of the non-aqueous solvent, the ink may be produced at low cost, meaning printed items may be produced at low cost. Further, because the ink A contains a silicone oil in an amount of at least 15% by mass relative to the total mass of the non-aqueous solvent, clear file deformation caused by printed items may be prevented. Moreover, similarly to the ink set of the first embodiment as described above, the image density immediately after printing may be improved.

Further, deterioration in the image density of black images over time may also be suppressed.

In this method for producing a printed item, two or more inks including the ink A and the ink B are discharged onto a recording medium to form an image.

From the viewpoint of achieving favorable black image density immediately after printing, the image is preferably formed by overlapping the ink A and the ink B on the recording medium.

The ink A and the ink B may be the same as the inks A and B respectively in the ink set of the first embodiment described above, and the descriptions for the inks A and B in the ink set of the first embodiment may also apply to the inks in this method.

There are no particular limitations on the printing method used with the inkjet inks, and any of various printing systems, including a piezo system, electrostatic system or thermal system may be used, but a piezo system is preferred. In those cases where an inkjet recording device is used, the inks of the present embodiment are preferably discharged from the inkjet head based on a digital signal, with the discharged ink droplets being adhered to the recording medium.

There are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

In terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

Two or more types of inks may be used for the oil-based inkjet ink A and/or the oil-based inkjet ink B. Further, other inks and/or treatment liquids and the like may also be used in addition to the oil-based inkjet ink A and the oil-based inkjet ink B.

There are no particular limitations on the order of discharge for the oil-based inkjet ink A and the oil-based inkjet ink B.

In this method for producing a printed item, it is preferable that, using an inkjet head having a first nozzle portion and a second nozzle portion, the oil-based inkjet ink A is discharged from the first nozzle portion and the oil-based inkjet ink B is discharged from the second nozzle portion to form an image on a recording medium.

The inkjet head having a first nozzle portion and a second nozzle portion, and the formation of an image on a recording medium by discharging the oil-based inkjet ink A from the first nozzle portion and discharging the oil-based inkjet ink B from the second nozzle portion are as described above in relation to a preferred embodiment of the ink set of the first embodiment. In a case in which the method includes, using the inkjet head having a first nozzle portion and a second nozzle portion, discharging the oil-based inkjet ink A from the first nozzle portion and discharging the oil-based inkjet ink B from the second nozzle portion as described above, the ink repellency of the nozzle plate may be improved.

The method for producing a printed item may also include one or more other steps such as a pretreatment step or a heating step.

Method for Producing Printed Item of Second Embodiment

A method for producing a printed item according to another embodiment is a method for producing a printed item including, using an inkjet head having a first nozzle portion and a second nozzle portion, discharging an oil-based inkjet ink A from the first nozzle portion and discharging an oil-based inkjet ink B from the second nozzle portion to form an image on a recording medium, wherein the oil-based inkjet ink A contains a non-aqueous solvent, and the non-aqueous solvent of the oil-based inkjet ink A contains at least 15% by mass of a silicone oil relative to the total mass of the non-aqueous solvent of the oil-based inkjet ink A, and the oil-based inkjet ink B contains a non-aqueous solvent, and the non-aqueous solvent of the oil-based inkjet ink B contains at least 50% by mass of a petroleum-based hydrocarbon solvent relative to the total mass of the non-aqueous solvent of the oil-based inkjet ink B. In the following description, this method is sometimes referred to as a method for producing a printed item according to a second embodiment.

According to this method for producing a printed item, similarly to the method for producing a printed item of the first embodiment, printed items may be produced at low cost, and clear file deformation caused by printed items may be prevented. Further, similarly to the ink set of the second embodiment, according to the method for producing a printed item of the second embodiment, the ink repellency of the nozzle plate may be improved.

In this method for producing a printed item, using an inkjet head having a first nozzle portion and a second nozzle portion, the oil-based inkjet ink A is discharged from the first nozzle portion and the oil-based inkjet ink B is discharged from the second nozzle portion to form an image on a recording medium.

The inkjet head having a first nozzle portion and a second nozzle portion, and the formation of an image by discharging the oil-based inkjet ink A from the first nozzle portion and discharging the oil-based inkjet ink B from the second nozzle portion are as described above for a preferred form of the ink set of the first embodiment, and the above description may also apply to this method.

In the method for producing a printed item of the second embodiment, the ink A and the ink B may be the same as the inks A and B respectively in the ink set of the second embodiment described above, and the descriptions of the inks A and B in the ink set of the second embodiment may also apply to the inks of this method.

The printing method using inkjet inks and the recording medium may be the same as described above in relation to the method for producing a printed item of the first embodiment, and the descriptions presented in the method for producing a printed item of the first embodiment may also apply to this method of the second embodiment.

Two or more types of inks may be used for the oil-based inkjet ink A and/or the oil-based inkjet ink B. One or more other inks and/or treatment liquids and the like may also be used in addition to the oil-based inkjet ink A and the oil-based inkjet ink B.

In an embodiment, use of the oil-based inkjet ink A and the oil-based inkjet ink B in the method for producing a printed item of the second embodiment is also provided.

One example of an inkjet printing device that can be used in the method for producing a printed item of the first embodiment and the method for producing a printed item of the second embodiment is described below using the drawings. However, the present invention is not limited to this particular device.

Figure 3:
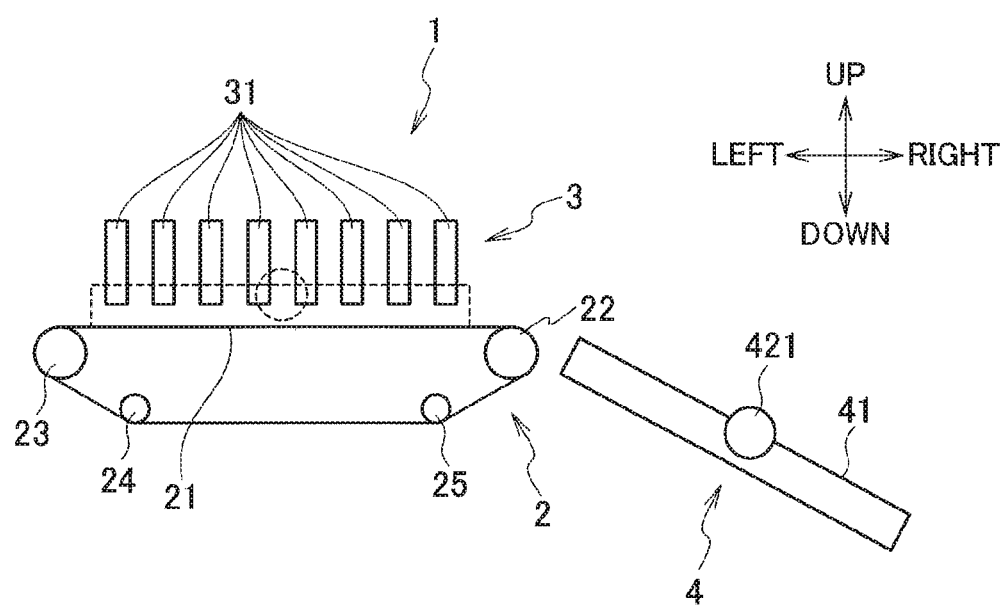
FIG. 3 is a schematic drawing of one example of an inkjet printing device.
Figure 4:
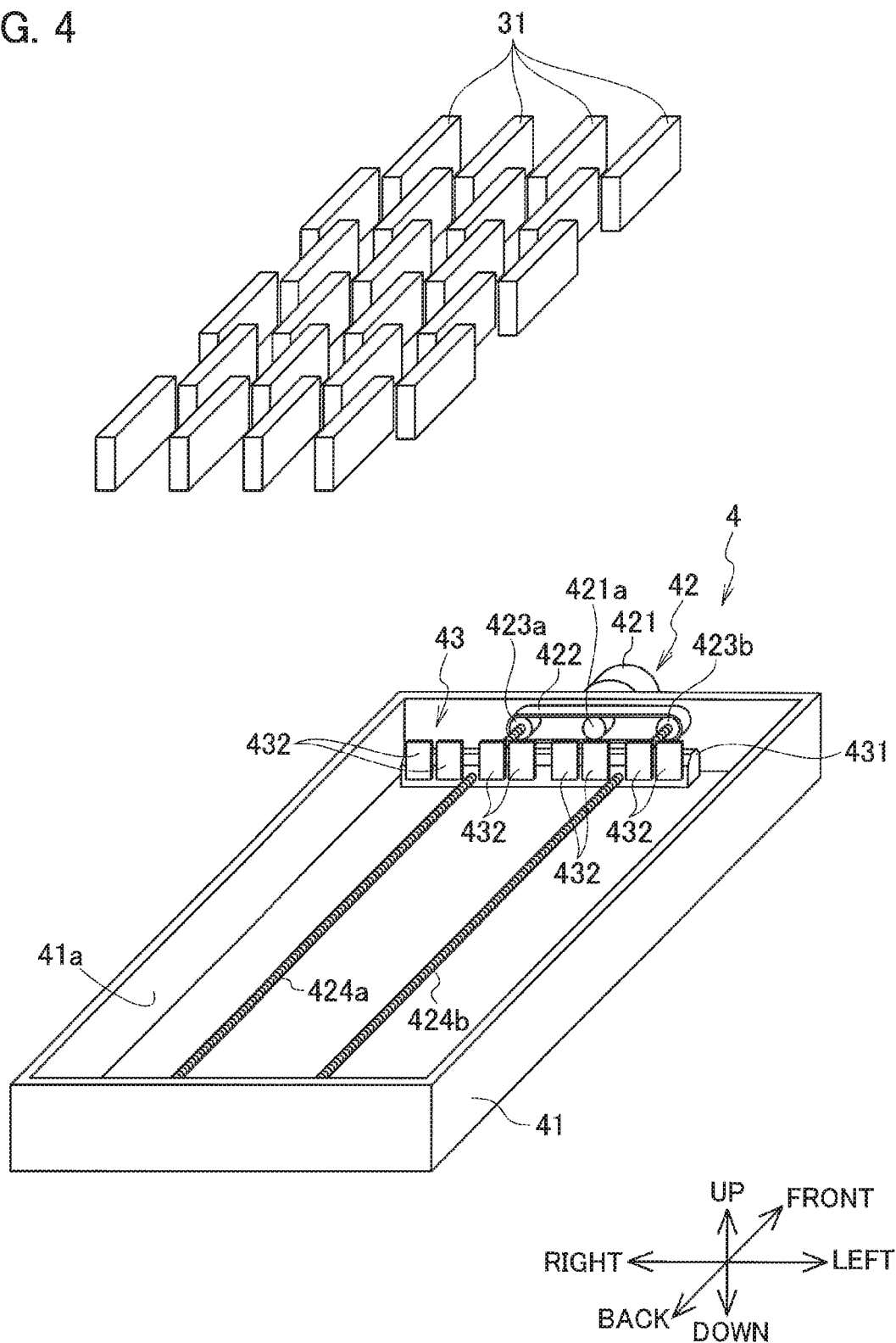
FIG. 4 is an exploded perspective view of one example of a maintenance unit.

FIG. 3 is a schematic drawing of one example of an inkjet printing device that may be used in the methods for producing a printed item according to the embodiments. FIG. 4 is an exploded perspective view of one example of a maintenance unit.

The inkjet printing device 1 of FIG. 3 has a transport unit 2, an inkjet head unit 3, and a maintenance unit 4.

The transport unit 2 has a transport belt 21 provided opposing the inkjet head unit 3, a drive roller 22 that rotationally drives the transport belt 21, and driven rollers 23, 24 and 25 that follow the drive roller 22.

The transport belt 21 is stretched around the drive roller 22 and the driven rollers 23, 24 and 25, and during printing, undergoes endless movement under the driving of the drive roller 22, thereby holding and transporting a paper transported from a supply base provided at the left side but not shown in the drawing.

The transport unit 2 can be moved between a printing position that is the position used during printing, and a retracted position located beneath the printing position. Movement of the transport unit 2 to the retracted position is performed when moving the maintenance unit 4 between the transport unit 2 and the inkjet head unit 3 during cleaning (maintenance) of the inkjet head unit 3.

The inkjet head unit 3 has line-type inkjet heads 31, and discharges ink onto the paper transported by the conveyor belt 21, thereby printing an image. The inkjet heads 31 may be inkjet heads having two or more nozzle arrays. The inkjet heads 31 are aligned above the transport section 2 along the left-right direction with prescribed spaces therebetween.

The maintenance unit 4 is used for cleaning the surface of the nozzle plate where the nozzles are formed in each of the inkjet heads 31. During printing, the maintenance unit 4 is located at a standby position shown by the solid lines in FIG. 3. The standby position is positioned to the lower right of the transport section 2. When maintenance is to be performed, the maintenance unit 4 is moved to a maintenance position shown by the dashed lines in FIG. 3. The maintenance position is located between the transport unit 2 and the inkjet heads 31.

As illustrated in FIG. 4, the maintenance unit 4 includes an ink-receiving member 41, a drive unit 42, a wiper unit 43, and a drive motor and vertical motor that are not shown in the drawing. FIG. 4 illustrates the state when the maintenance unit 4 is located at the maintenance position.

The ink-receiving member 41 receives ink and the like that is removed by cleaning. The ink-receiving member 41 also supports each of the other members of the maintenance unit 4. The ink-receiving member 41 is formed with a rectangular shape. A recessed portion 41a for collecting the ink and the like is formed in the center of the ink-receiving member 41. The recessed portion 41a is formed of a size which, when viewed in plan view, is larger than the region across which the inkjet heads 31 are disposed. The top surface of the ink-receiving member 41 is open.

The drive unit 42 is used for moving the wiper unit 43 forwards and backwards during maintenance. The drive unit 42 has a wiper drive motor 421, a drive belt 422, a pair of drive pulleys 423a and 423b, and a pair of crossed helical gears 424a and 424b. The wiper drive motor 421 has an output gear 421a.

The wiper unit 43 wipes the inkjet head nozzle plate surface of each of the inkjet heads 31 during maintenance, thereby removing ink and the like adhered to the nozzle plate surface, and is provided with a mount 431 and eight wipers 432.

The mount 431 is the component to which the wipers 432 are attached, and is composed of a long, thin prism-shaped member that extends across the left-right direction. A pair of screw holes are formed in the mount 431, and the crossed helical gears 424a and 424b pass through and engage with these screw holes respectively. By rotating the crossed helical gears 424a and 424b, the mount 431 can be moved forward and backward.

The wipers 432 remove ink and the like by sliding across the nozzle plate surfaces of the inkjet heads 31. The wipers 432 are formed from a material such as an elastically deformable rubber or the like. The material used for forming the wipers 432 is preferably a material having sufficient elasticity that it does not damage the nozzle surfaces. The wipers 432 are formed in the shape of thin rectangular plates.

When in the maintenance position, the top edges of the wipers 432 are positioned higher than the nozzle plates of the inkjet heads 31. As a result, when the wipers 432 are moved in the forward and backward directions and contact the inkjet heads 31, the wipers 432 undergo elastic deformation and slide across the nozzle plates.

In a cleaning operation, for example, the paths for supplying the inks to the inkjet heads 31 are pressurized to force the inks from the nozzles of the inkjet heads (so-called purging). Subsequently, the wiper drive motor 421 is activated to move the wipers 432 and wipe the inkjet heads 31.

When the wiper drive motor 421 is activated, the rotational driving force of the wiper drive motor 421 is transmitted to the output gear 421a, the drive belt 422 and the drive pulleys 423a and 423b, thereby rotating the crossed helical gears 424a and 424b. As a result, the wipers 432 move in the backward direction together with the mount 431 that is engaged with the crossed helical gears 424a and 424b. The upper portions of the wipers 432 are moved to the point of contact with the inkjet heads, and the wipers 432 are then forced against the inkjet heads 31 and undergo elastic deformation. By continuing to move the wipers 432 backward in this state, the trailing edges of the wipers 432 slides across the nozzle plates of the inkjet heads.

By performing wiping in this manner, ink and other dirt adhered to the nozzle plates is removed.

Exemplary embodiments of the present invention include the following. The present invention is no way limited by the following exemplary embodiments.

<1> An oil-based inkjet ink set comprising:

an oil-based inkjet ink A, which is a black ink and comprises a pigment, a pigment dispersant and a non-aqueous solvent, the non-aqueous solvent of the oil-based inkjet ink A containing at least 15% by mass of a silicone oil relative to a total mass of the non-aqueous solvent of the oil-based inkjet ink A, and an oil-based inkjet ink B, which is a color ink and comprises a pigment, a pigment dispersant and a non-aqueous solvent, the non-aqueous solvent of the oil-based inkjet ink A containing at least 50% by mass of a petroleum-based hydrocarbon solvent relative to a total mass of the non-aqueous solvent of the oil-based inkjet ink B.

<2> The oil-based inkjet ink set according to <1>, which is used for inkjet printing which includes, using an inkjet head having a first nozzle portion and a second nozzle portion, discharging the oil-based inkjet ink A from the first nozzle portion and discharging the oil-based inkjet ink B from the second nozzle portion to form an image on a recording medium.

<3> An oil-based inkjet ink set comprising:

an oil-based inkjet ink A comprising a non-aqueous solvent, the non-aqueous solvent of the oil-based inkjet ink A containing at least 15% by mass of a silicone oil relative to a total mass of the non-aqueous solvent of the oil-based inkjet ink A, and an oil-based inkjet ink B comprising a non-aqueous solvent, the non-aqueous solvent of the oil-based inkjet ink B containing at least 50% by mass of a petroleum-based hydrocarbon solvent relative to a total mass of the non-aqueous solvent of the oil-based inkjet ink B, wherein the oil-based inkjet ink set is used for inkjet printing which includes, using an inkjet head having a first nozzle portion and a second nozzle portion, discharging the oil-based inkjet ink A from the first nozzle portion and discharging the oil-based inkjet ink B from the second nozzle portion to form an image on a recording medium.

<4> The oil-based inkjet ink set according to any one of <1> to <3>, wherein a surface tension of the oil-based inkjet ink A is at least 19 mN/m but less than 26 mN/m, and a surface tension of the oil-based inkjet ink B is at least 26 mN/m but not more than 30 mN/m.

<5> The oil-based inkjet ink set according to any one of <1> to <4>, wherein the non-aqueous solvent of the oil-based inkjet ink A further comprises at least one selected from the group consisting of a fatty acid ester-based solvent and a higher alcohol-based solvent.

<6> The oil-based inkjet ink set according to any one of <1> to <5>, wherein the non-aqueous solvent of the oil-based inkjet ink B further comprises at least one selected from the group consisting of a fatty acid ester-based solvent and a higher alcohol-based solvent.

<7> The oil-based inkjet ink set according to any one of <1> to <6>, wherein the silicone oil comprises a modified silicone oil having 2 to 6 silicon atoms in one molecule, having an organic group in which a carbon atom is bonded directly to a silicon atom and in which a total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule.

<8> The oil-based inkjet ink set according to <7>, wherein the organic group in which the total number of carbon atoms and oxygen atoms is at least 4 that is included in the modified silicone oil comprises at least one group selected from the group consisting of an alkyl group having at least 4 carbon atoms, a carboxylate ester linkage-containing group in which a total number of carbon atoms and oxygen atoms is at least 4, an aromatic ring-containing group having at least 6 carbon atoms, and an alkylene group having at least 4 carbon atoms.

<9> A method for producing a printed item, comprising discharging two or more inks onto a recording medium to form an image, wherein the two or more inks comprise:

an oil-based inkjet ink A, which is a black ink and comprises a pigment, a pigment dispersant and a non-aqueous solvent, the non-aqueous solvent of the oil-based inkjet ink A containing at least 15% by mass of a silicone oil relative to a total mass of the non-aqueous solvent of the oil-based inkjet ink A, and an oil-based inkjet ink B, which is a color ink and comprises a pigment, a pigment dispersant and a non-aqueous solvent, the non-aqueous solvent of the oil-based inkjet ink B containing at least 50% by mass of a petroleum-based hydrocarbon solvent relative to a total mass of the non-aqueous solvent of the oil-based inkjet ink B.

<10> The method for producing a printed item according to <9>, wherein the method comprises, using an inkjet head having a first nozzle portion and a second nozzle portion, discharging the oil-based inkjet ink A from the first nozzle portion and discharging the oil-based inkjet ink B from the second nozzle portion to form the image on the recording medium.

<11> A method for producing a printed item, comprising, using an inkjet head having a first nozzle portion and a second nozzle portion, discharging an oil-based inkjet ink A from the first nozzle portion and discharging an oil-based inkjet ink B from the second nozzle portion to form an image on a recording medium, wherein the oil-based inkjet ink A comprises a non-aqueous solvent, and the non-aqueous solvent of the oil-based inkjet ink A contains at least 15% by mass of a silicone oil relative to a total mass of the non-aqueous solvent of the oil-based inkjet ink A, and the oil-based inkjet ink B comprises a non-aqueous solvent, and the non-aqueous solvent of the oil-based inkjet ink B contains at least 50% by mass of a petroleum-based hydrocarbon solvent relative to a total mass of the non-aqueous solvent of the oil-based inkjet ink B.

<12> The method for producing a printed item according to any one of <9> to <11>, wherein the image is formed by overlapping the oil-based inkjet ink A and the oil-based inkjet ink B on the recording medium.

EXAMPLES

The present invention is described below in further detail using a series of examples. The present invention is in no way limited by the following examples.

Synthesis of Silicone Oils

1. Silicone Oil 2

A four-necked flask was charged with 50 parts by mass of hexane, 10 parts by mass of 1,1,1,3,5,5,5-heptamethyltrisiloxane (manufactured by Tokyo Chemical Industry Co., Ltd.), and 5.6 parts by mass of vinyl butyrate (manufactured by Tokyo Chemical Industry Co., Ltd.). Subsequently, 0.02 parts by mass of a platinum catalyst (1,3-divinyl-1,1,3,3-tetramethyldisiloxane platinum complex, manufactured by Sigma-Aldrich Corporation) was added to the flask, and the resulting mixture was stirred at room temperature for 2 to 3 hours. The reaction solvent (hexane) and any unreacted raw materials were then removed by distillation under reduced pressure to obtain a target compound of the structure shown below.

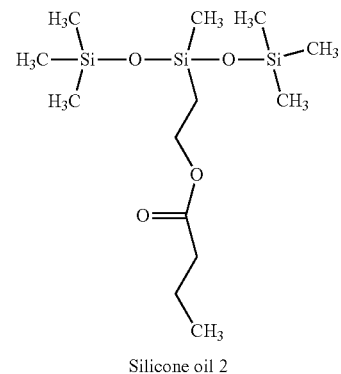

Silicone oil 2

2. Silicone Oil 3

A four-necked flask was charged with 50 parts by mass of hexane, 10 parts by mass of 1,1,1,3,3,5,5-heptamethyltrisiloxane (manufactured by Gelest, Inc.), and 5.7 parts by mass of 3-phenyl-1-propne (manufactured by Tokyo Chemical Industry Co., Ltd.). Subsequently, 0.02 parts by mass of a platinum catalyst (1,3-divinyl-1,1,3,3-tetramethyldisiloxane platinum complex, manufactured by Sigma-Aldrich Corporation) was added to the flask, and the resulting mixture was stirred at room temperature for 2 to 3 hours. The reaction solvent (hexane) and any unreacted raw materials were then removed by distillation under reduced pressure to obtain a target compound of the structure shown below.

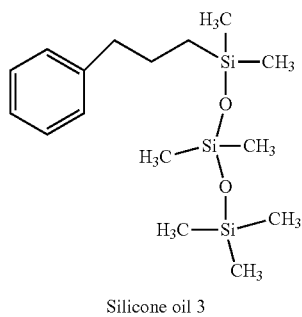 [SMILES: C[Si](C)(C)O[Si](C)(C)O[Si](C)(C)CCCc1ccccc1]

Silicone oil 3

3. Silicone Oil 4

A four-necked flask was charged with 50 parts by mass of hexane, 20 parts by mass of pentamethyldisiloxane (manufactured by Gelest, Inc.), and 4.0 parts by mass of 1,3-butadiene (manufactured by Tokyo Chemical Industry Co., Ltd.). Subsequently, 0.02 parts by mass of a platinum catalyst (1,3-divinyl-1,1,3,3-tetramethyldisiloxane platinum complex, manufactured by Sigma-Aldrich Corporation) was added to the flask, and the resulting mixture was stirred at room temperature for 2 to 3 hours. The reaction solvent (hexane) and any unreacted raw materials were then removed by distillation under reduced pressure to obtain a target compound of the structure shown below.

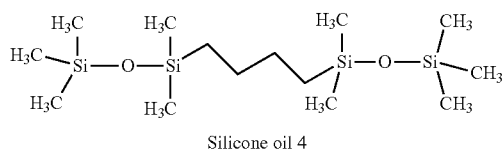

Silicone oil 4

Preparation of Inks

Ink formulations are shown in Tables 1 and 2.

The pigments, pigment dispersants, and the various solvents shown in each of the tables were mixed together in accordance with the amounts shown in Tables 1 and 2, and in each case, the pigment was dispersed thoroughly using a beads mill (Dyno-Mill KDL-A, manufactured by Shinmaru Enterprises Corporation) under conditions including a residence time of 15 minutes. Subsequently, coarse particles were removed with a membrane filter to obtain the ink.

In Tables 1 and 2, K1 to K9, C1 to C6, M1 and Y1 represent inks K1 to K9, C1 to C6, M1 and Y1 respectively.

The materials used were as follows.

1. Pigments

Carbon black: Special Black 350, manufactured by Evonik Japan Co., Ltd.

Copper phthalocyanine blue (cyan pigment): FASTOGEN Blue LA5380, manufactured by DIC Corporation Soluble azo lake pigment (magenta pigment): SYMULER Brilliant Carmine 6B 400S, manufactured by DIC Corporation Insoluble azo pigment (yellow pigment): SEIKA FAST YELLOW 2700 (B), manufactured by Dainichiseika Color & Chemicals Mfg. Co., Ltd.

2. Pigment Dispersants

S1800: Solsperse 18000, manufactured by The Lubrizol Corporation (a fatty acid amine-based dispersant, solid fraction: 100% by mass)

Disperbyk 2155: DISPERBYK 2155, manufactured by BYK-Chemie Japan K.K. (solid fraction: 100% by mass)

3. Non-Aqueous Solvents

Silicone oil 1: DOW CORNING FZ-3196 (3-octylheptamethyltrisiloxane (an alkyl-modified silicone oil)), manufactured by Dow Corning Toray Co., Ltd.

Silicone oil 2: synthesized above (a carboxylate ester-modified silicone oil)

Silicone oil 3: synthesized above (an aryl-modified silicone oil (aralkyl-modified silicone oil))

Silicone oil 4: synthesized above (an alkylene-modified silicone oil)

Silicone oil 5: KF-96L-5cs (a dimethyl silicone oil (linear dimethyl silicone oil)), manufactured by Shin-Etsu Chemical Co., Ltd.

Petroleum-based hydrocarbon solvent 1: Exxsol D-130 (a naphthene-based solvent), manufactured by Exxon Mobil Corporation Petroleum-based hydrocarbon solvent 2: Isopar H (an isoparaffin-based solvent), manufactured by Exxon Mobil Corporation Fatty acid ester-based solvent: Salacos 913 (isotridecyl isononanoate), manufactured by The Nisshin OilliO Group Higher alcohol-based solvent: 1-octadecanol, manufactured by Tokyo Chemical Industry Co., Ltd.

The surface tension values for the solvents and inks shown in the tables were determined using the Science Line t60 device manufactured by SITA Process Solutions of SITA Messtechnik GmbH, under measurement conditions including 23° C. and 0.05 Hz.

TABLE 1

| | Units: % by mass | | | K1 | K2 | K3 | K4 | K5 | K6 | K7 | K8 | K9 |
|---|---|---|---|---|---|---|---|---|---|---|---|---|
| Pigment | | Carbon black | | 10 | 10 | 10 | 10 | 10 | 10 | 10 | 10 | 10 |
| Pigment dispersant | | S18000 | | 7 | 7 | 7 | 7 | 7 | 7 | 7 | 7 | 7 |
| Non-aqueous solvent | Silicone oil 1 | Alkyl-modified silicone oil | Surface tension 20.7 [mN/m] | 83 | | | | | | | 73 | 53 |
| | Silicone oil 2 | Carboxylate ester-modified silicone oil | Surface tension 21.6 [mN/m] | | 83 | | | | | | | |
| | Silicone oil 3 | Aryl-modified silicone oil | Surface tension 22.9 [mN/m] | | | 83 | | | | | | 24 |
| | Silicone oil 4 | Alkylene-modified silicone oil | Surface tension 18.8 [mN/m] | | | | 83 | | | | | |

TABLE 1-continued

| Units: % by mass | | | K1 | K2 | K3 | K4 | K5 | K6 | K7 | K8 | K9 |
|---|---|---|---|---|---|---|---|---|---|---|---|
| Silicone oil 5 | Dimethyl silicone oil | Surface tension 19.7 [mN/m] | | | | | | 83 | | | |
| Petroleum-based hydrocarbon solvent 1 | Naphthene-based solvent | Surface tension 28.0 [mN/m] | | | | | | | 83 | | |
| Fatty acid ester-based solvent | Isotridecyl isononanoate | Surface tension 30.0 [mN/m] | | | | | | | | 25 | 59 |
| Higher alcohol-based solvent | 1-octadecanol | Surface tension 31.4 [mN/m] | | | | | | | | 10 | 5 |
| Total (% by mass) | | | 100 | 100 | 100 | 100 | 100 | 100 | 100 | 100 | 100 |
| Proportion of silicone oil in non-aqueous solvent [% by mass] | | | 100.0 | 100.0 | 100.0 | 100.0 | 100.0 | 100.0 | 88.0 | 63.9 | 28.9 |
| Proportion of polar solvent in non-aqueous solvent [% by mass] | | | 0.0 | 0.0 | 0.0 | 0.0 | 0.0 | 0.0 | 12.0 | 36.1 | 71.1 |
| Ink surface tension [mN/m] | | | 21.7 | 22.6 | 23.9 | 19.8 | 20.7 | 27.8 | 24.0 | 25.2 | 27.3 |

TABLE 2

| Units: % by mass | | | C1 | C2 | C3 | C4 | C5 | C6 | M1 | Y1 |
|---|---|---|---|---|---|---|---|---|---|---|
| Pigment | Copper phthalocyanine blue (cyan pigment) | | 5 | 5 | 5 | 5 | 5 | 5 | | |
| | Soluble azo lake pigment (magenta pigment) | | | | | | | | 5 | |
| | Insoluble azo pigment (yellow pigment) | | | | | | | | | 5 |
| Pigment dispersant | Disperbyk 2155 | | 5 | 5 | 5 | 5 | 5 | 5 | 5 | 5 |
| Non-aqueous solvent | Silicone oil 1 | Alkyl-modified silicone oil Surface tension 20.7 [mN/m] | | | 90 | | | | | |
| | Silicone oil 5 | Dimethyl silicone oil Surface tension 19.7 [mN/m] | | | | 90 | | | | |
| | Petroleum-based hydrocarbon solvent 1 | Naphthene-based solvent Surface tension 28.0 [mN/m] | 90 | | | | 75 | 60 | 90 | 90 |
| | Petroleum-based hydrocarbon solvent 2 | Isoparaffin-based solvent Surface tension 23.0 [mN/m] | | 90 | | | | | | |
| | Fatty acid ester-based solvent | Isotridecyl isononanoate Surface tension 30.0 [mN/m] | | | | | | 30 | | |
| | Higher alcohol-based solvent | 1-octadecanol Surface tension 31.4 [mN/m] | | | | | 15 | | | |
| Total (% by mass) | | | 100 | 100 | 100 | 100 | 100 | 100 | 100 | 100 |
| Proportion of petroleum-based hydrocarbon solvent in non-aqueous solvent [% by mass] | | | 100.0 | 100.0 | 0.0 | 0.0 | 83.3 | 66.7 | 100.0 | 100.0 |
| Proportion of polar solvent in non-aqueous solvent [% by mass] | | | 0.0 | 0.0 | 0.0 | 0.0 | 16.7 | 33.3 | 0.0 | 0.0 |
| Ink surface tension [mN/m] | | | 29.0 | 24.0 | 21.7 | 20.7 | 26.7 | 27.8 | 29.0 | 29.0 |

Evaluations

Using the inks K1 to K9, C1 to C6, M1 and Y1 prepared in the manner described above, evaluations were performed using the methods described below. The results of these evaluations are shown in Table 3. In Table 3, K1 to K9, C1 to C6, M1 and Y1 represent the inks K1 to K9, C1 to C6, M1 and Y1 respectively.

1. Image Density Immediately after Printing

In each of the examples and comparative examples, the two inks shown in Table 3 were loaded into a line-type inkjet printer "ORPHIS FW5230" (manufactured by RISO KAGAKU CORPORATION), and a composite black solid image (black solid image) was printed onto a plain paper "RISO Paper Thin Type" (manufactured by RISO KAGAKU CORPORATION) at a print speed of 120 ppm and a resolution of 300 dpi×300 dpi, thus forming a printed item.

The image density (surface density) of the black solid image of the thus obtained printed item was measured using a colorimeter X-Rite eXact (manufactured by Videoj et X-Rite K.K.), and then evaluated against the following evaluation criteria.

Evaluation Criteria
 S: OD value of 1.15 or greater
 A: OD value of at least 1.12 but less than 1.15
 B: OD value of at least 1.07 but less than 1.12
 C: OD value of less than 1.07

2. Change in Density of Black Image Over Time

The printed item obtained above was left to stand for one week in an environment at 23° C. and 50% RH, and subsequently, the image density (surface density) of the composite black solid image (black solid image) was measured using a colorimeter X-Rite eXact (manufactured by Videoj et X-Rite K.K.). The difference between the OD value of the black solid image after standing for one week and the OD value of the black solid image immediately after printing was evaluated against the following evaluation criteria.

Evaluation Criteria
 A: OD value difference of less than 0.05
 B: OD value difference of at least 0.05 but less than 0.1
 C: OD value difference of 0.1 or greater 3. Ink Repellency The ink repellency of the nozzle plate was evaluated by performing printing, subsequently performing cleaning of the inkjet head by forcing ink from the inkjet head nozzles (purging) and then wiping the nozzle plate, before evaluating the discharge characteristics from the nozzles. This is because by improving the ink repellency of the nozzle plate, adhesion of ink to the nozzle head is suppressed, enabling the discharge characteristics to be improved.

In each of the examples and comparative examples, the two inks shown in Table 3 were loaded into a line-type inkjet printer "ORPHIS FW5230" (manufactured by RISO KAGAKU CORPORATION), and 1,000 copies of a solid image were printed continuously onto a plain paper "RISO Paper Thin Type" (manufactured by RISO KAGAKU COR-PORATION) at a print speed of 120 ppm and a resolution of 300 dpi×300 dpi, and a single cleaning operation of the inkjet head was then performed (by forcing ink from the inkjet head nozzles, and then wiping the nozzle plate). Subsequently, a single solid image was printed and inspected to ascertain whether white bands had occurred in the image, and if present, how many bands had occurred. The ink repellency was then evaluated against the following criteria.

An inkjet head having two nozzle arrays was mounted in the inkjet printer "ORPHIS FW5230" that was used. The ink A was discharged from one nozzle array, and the ink B was discharged from the other nozzle array.

Evaluation Criteria
S: either no white bands occurred, or two or fewer bands occurred
A: at least 3 but less than 4 white bands occurred
B: at least 4 but less than 5 white bands occurred
C: at least 5 white bands occurred 4. Clear File Waviness In each of the examples and comparative examples, the two inks shown in Table 3 were loaded into a line-type inkjet printer "ORPHIS FW5230" (manufactured by RISO KAGAKU CORPORATION), and a single printed item was produced by printing a solid image onto a plain paper "RISO Paper Thin Type" (manufactured by RISO KAGAKU CORPORATION) at a print speed of 120 ppm and a resolution of 300 dpi×300 dpi. The thus obtained printed item was inserted in a PP (polypropylene) clear file, and following standing at room temperature for one week, the clear file was placed on a flat surface, and the maximum height that the clear file had been deformed and lifted from the flat surface was measured to evaluate the clear file deformation. The amount of clear file deformation measured in this manner was evaluated against the following evaluation criteria.

Evaluation Criteria
A: amount of clear file deformation of less than 5 cm
B: amount of clear file deformation of at least 5 cm but less than 10 cm
C: amount of clear file deformation of at least 10 cm

TABLE 3

|  | Example 1 | Example 2 | Example 3 | Example 4 | Example 5 | Example 6 | Example 7 | Example 8 | Example 9 |
| --- | --- | --- | --- | --- | --- | --- | --- | --- | --- |
| Ink A | K1 | K2 | K3 | K4 | K5 | K1 | K7 | K8 | K9 |
| Ink B | C1 | C1 | C1 | C1 | C1 | C2 | C1 | C1 | C1 |
| Image density immediately after printing | A | A | A | A | A | A | S | S | A |
| Change in image density of black image over time | A | A | A | A | A | A | A | A | B |
| Ink repellency | A | A | A | A | A | B | S | S | S |
| Clear file waviness | A | A | A | A | A | A | A | A | B |

|  | Example 10 | Example 11 | Example 12 | Example 13 | Comparative Example 1 | Comparative Example 2 | Comparative Example 3 |
| --- | --- | --- | --- | --- | --- | --- | --- |
| Ink A | K1 | K1 | K1 | K1 | K1 | K6 | K6 |
| Ink B | C5 | C6 | M1 | Y1 | C4 | C1 | C3 |
| Image density immediately after printing | A | A | B | B | A | C | C |
| Change in image density of black image over time | A | A | A | A | A | C | A |
| Ink repellency | S | S | A | A | C | A | A |
| Clear file waviness | A | A | A | A | A | C | A |

As shown in Table 3, in Examples 1 to 13, which used an ink A containing at least 15% by mass of a silicone oil relative to the total mass of the non-aqueous solvent, and an ink B containing at least 50% by mass of a petroleum-based hydrocarbon solvent relative to the total mass of the non-aqueous solvent, clear file waviness was suppressed. In Examples 1 to 8 and Examples 10 to 13 in which the amount of silicone oil in the ink A was comparatively large, the suppression effect on clear file waviness was superior to that observed in Example 9. Further, because the solvent used in a large amount in the ink B is a typical inexpensive petroleum-based hydrocarbon solvent, the ink production costs and the printed item production costs can be reduced. Furthermore, in Examples 1 to 13, the image density immediately after printing and the change in image density of a black image over time were also excellent. Moreover, in the ink repellency evaluation performed using an inkjet head having two nozzle arrays, excellent ink repellency was achieved.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:
1. An oil-based inkjet ink set comprising:
    an oil-based inkjet ink A, which is a black ink and comprises a pigment, a pigment dispersant and a non-aqueous solvent, the non-aqueous solvent of the oil-based inkjet ink A containing at least 15% by mass of a silicone oil relative to a total mass of the non-aqueous solvent of the oil-based inkjet ink A, and an oil-based inkjet ink B, which is a color ink and comprises a pigment, a pigment dispersant and a non-aqueous solvent, the non-aqueous solvent of the oil-based inkjet ink B containing at least 50% by mass of a petroleum-based hydrocarbon solvent relative to a total mass of the non-aqueous solvent of the oil-based inkjet ink B.

2. The oil-based inkjet ink set according to claim 1, wherein a surface tension of the oil-based inkjet ink A is at least 19 mN/m but less than 26 mN/m at 23° C., and a surface tension of the oil-based inkjet ink B is at least 26 mN/m but not more than 30 mN/m at 23° C.

3. The oil-based inkjet ink set according to claim 1, wherein the non-aqueous solvent of the oil-based inkjet ink A further comprises at least one selected from the group consisting of a fatty acid ester-based solvent and a higher alcohol-based solvent.

4. The oil-based inkjet ink set according to claim 1, wherein the non-aqueous solvent of the oil-based inkjet ink B further comprises at least one selected from the group consisting of a fatty acid ester-based solvent and a higher alcohol-based solvent.

5. The oil-based inkjet ink set according to claim 1, wherein the silicone oil comprises a modified silicone oil
having 2 to 6 silicon atoms in one molecule,
having an organic group in which a carbon atom is bonded directly to a silicon atom and in which a total number of carbon atoms and oxygen atoms is at least 4, and
having a total number of carbon atoms and oxygen atoms, contained within all of the organic groups in which the total number of carbon atoms and oxygen atoms is at least 4, that is from 4 to 20 within one molecule.

6. The oil-based inkjet ink set according to claim 5, wherein the organic group in which the total number of carbon atoms and oxygen atoms is at least 4 that is included in the modified silicone oil comprises at least one group selected from the group consisting of an alkyl group having at least 4 carbon atoms, a carboxylate ester linkage-containing group in which a total number of carbon atoms and oxygen atoms is at least 4, an aromatic ring-containing group having at least 6 carbon atoms, and an alkylene group having at least 4 carbon atoms.

7. A method for producing a printed item, comprising discharging two or more inks onto a recording medium to form an image, wherein
the two or more inks comprise:
an oil-based inkjet ink A, which is a black ink and comprises a pigment, a pigment dispersant and a non-aqueous solvent, the non-aqueous solvent of the oil-based inkjet ink A containing at least 15% by mass of a silicone oil relative to a total mass of the non-aqueous solvent of the oil-based inkjet ink A, and
an oil-based inkjet ink B, which is a color ink and comprises a pigment, a pigment dispersant and a non-aqueous solvent, the non-aqueous solvent of the oil-based inkjet ink B containing at least 50% by mass of a petroleum-based hydrocarbon solvent relative to a total mass of the non-aqueous solvent of the oil-based inkjet ink B.

8. The method for producing a printed item according to claim 7, wherein the method comprises, using an inkjet head having a first nozzle portion and a second nozzle portion, discharging the oil-based inkjet ink A from the first nozzle portion and discharging the oil-based inkjet ink B from the second nozzle portion to form the image on the recording medium.

9. The method for producing a printed item according to claim 7, wherein the image is formed by overlapping the oil-based inkjet ink A and the oil-based inkjet ink B on the recording medium.

10. The method for producing a printed item according to claim 7, wherein a surface tension of the oil-based inkjet ink A is at least 19 mN/m but less than 26 mN/m at 23° C., and a surface tension of the oil-based inkjet ink B is at least 26 mN/m but not more than 30 mN/m at 23° C.

11. The method for producing a printed item according to claim 7, wherein the non-aqueous solvent of the oil-based inkjet ink A further comprises at least one selected from the group consisting of a fatty acid ester-based solvent and a higher alcohol-based solvent.

12. The method for producing a printed item according to claim 7, wherein the non-aqueous solvent of the oil-based inkjet ink B further comprises at least one selected from the group consisting of a fatty acid ester-based solvent and a higher alcohol-based solvent.

13. The method for producing a printed item according to claim 7, wherein the silicone oil comprises a modified silicone oil
having 2 to 6 silicon atoms in one molecule,
having an organic group in which a carbon atom is bonded directly to a silicon atom and in which a total number of carbon atoms and oxygen atoms is at least 4, and
having a total number of carbon atoms and oxygen atoms, contained within all of the organic groups in which the total number of carbon atoms and oxygen atoms is at least 4, that is from 4 to 20 within one molecule.

14. A method for producing a printed item, comprising, using an inkjet head having a first nozzle portion and a second nozzle portion, discharging an oil-based inkjet ink A from the first nozzle portion and discharging an oil-based inkjet ink B from the second nozzle portion to form an image on a recording medium, wherein
the oil-based inkjet ink A comprises a non-aqueous solvent, and the non-aqueous solvent of the oil-based inkjet ink A contains at least 15% by mass of a silicone oil relative to a total mass of the non-aqueous solvent of the oil-based inkjet ink A, and
the oil-based inkjet ink B comprises a non-aqueous solvent, and the non-aqueous solvent of the oil-based inkjet ink B contains at least 50% by mass of a petroleum-based hydrocarbon solvent relative to a total mass of the non-aqueous solvent of the oil-based inkjet ink B.

15. The method for producing a printed item according to claim 14, wherein the image is formed by overlapping the oil-based inkjet ink A and the oil-based inkjet ink B on the recording medium.

16. The method for producing a printed item according to claim 14, wherein a surface tension of the oil-based inkjet ink A is at least 19 mN/m but less than 26 mN/m at 23° C., and a surface tension of the oil-based inkjet ink B is at least 26 mN/m but not more than 30 mN/m at 23° C.

17. The method for producing a printed item according to claim 14, wherein the non-aqueous solvent of the oil-based inkjet ink A further comprises at least one selected from the group consisting of a fatty acid ester-based solvent and a higher alcohol-based solvent.

18. The method for producing a printed item according to claim 14, wherein the non-aqueous solvent of the oil-based inkjet ink B further comprises at least one selected from the group consisting of a fatty acid ester-based solvent and a higher alcohol-based solvent.

19. The method for producing a printed item according to claim 14, wherein the silicone oil comprises a modified silicone oil
   having 2 to 6 silicon atoms in one molecule,
   having an organic group in which a carbon atom is bonded directly to a silicon atom and in which a total number of carbon atoms and oxygen atoms is at least 4, and
   having a total number of carbon atoms and oxygen atoms, contained within all of the organic groups in which the total number of carbon atoms and oxygen atoms is at least 4, that is from 4 to 20 within one molecule.

20. The method for producing a printed item according to claim 19, wherein the organic group in which the total number of carbon atoms and oxygen atoms is at least 4 that is included in the modified silicone oil comprises at least one group selected from the group consisting of an alkyl group having at least 4 carbon atoms, a carboxylate ester linkage-containing group in which a total number of carbon atoms and oxygen atoms is at least 4, an aromatic ring-containing group having at least 6 carbon atoms, and an alkylene group having at least 4 carbon atoms.

* * * * *